United States Patent [19]

Matsuda

[11] Patent Number: 5,058,020
[45] Date of Patent: Oct. 15, 1991

[54] ANTI-SKID BRAKE CONTROL SYSTEM FOR AUTOMOTIVE VEHICLE WITH FEATURE OF VARIABLE TIMING OF DERIVATION OF WHEEL ACCELERATION DATA

[75] Inventor: Toshiro Matsuda, Kanagawa, Japan

[73] Assignee: Nissan Motor Company, Limited, Yokohama, Japan

[21] Appl. No.: 329,842

[22] Filed: Mar. 28, 1989

[30] Foreign Application Priority Data

Mar. 29, 1988 [JP] Japan .................................. 63-73452

[51] Int. Cl.$^5$ .............................................. B60T 8/34
[52] U.S. Cl. .............................. 364/426.02; 364/566; 303/97; 303/99
[58] Field of Search ................. 364/426.02, 565, 566; 303/97, 99, 105

[56] References Cited

U.S. PATENT DOCUMENTS

| | | | |
|---|---|---|---|
| 4,665,491 | 5/1987 | Kubo | 364/566 |
| 4,669,045 | 5/1987 | Kubo | 364/566 |
| 4,680,714 | 7/1987 | Kubo | 364/566 |
| 4,876,650 | 10/1989 | Kubo | 364/566 |

*Primary Examiner*—Gary Chin
*Attorney, Agent, or Firm*—Foley & Lardner

[57] ABSTRACT

An anti-skid brake control system is provided with two wheel acceleration deriving circuits. A first wheel acceleration deriving circuit provides a timing for deriving wheel acceleration data with a relatively longer interval, which longer interval is long enough to obtain a good number of wheel speed data for deriving first wheel acceleration with satisfactorily high precision level. On the other hand, a second wheel acceleration deriving circuit provides a timing for deriving wheel acceleration data with a relatively shorter interval, which shorter interval is short enough for deriving wheel acceleration data with satisfactorily high response characteristics. The wheel acceleration data derived by the first wheel acceleration data is utilized in deteceting timing for switching operational mode of the anti-skid brake control system from an APPLICATION mode or RELEASE mode in which braking pressure is decreased to a HOLD mode in which braking pressure is maintained at constant value. On the other hand, the wheel acceleration data derived by the second wheel acceleration deriving circuit is utilized for detecting a peak value of the wheel acceleration.

18 Claims, 12 Drawing Sheets

ANTI-SKID BRAKE CONTROL SYSTEM FOR AUTOMOTIVE VEHICLE WITH FEATURE OF VARIABLE TIMING OF DERIVATION OF WHEEL ACCELERATION DATA

BACKGROUND OF THE INVENTION

1. Field of the Invention

The present invention relates generally to an anti-skid brake control system for automotive vehicle, which controls braking pressure in order to maintain wheel slippage at an optimum level for optimal vehicular braking performance. More specifically, the invention relates to a derivation of wheel acceleration at selectively variable timing depending upon the vehicle driving condition so that precision level and response characteristics of derivation of wheel acceleration data may be suitably adapted to a requirement which can be varied depending upon the vehicle driving condition.

2. Description of the Background Art

Recently, various constructions and operations of anti-skid vehicular brake control systems have been proposed for improving deceleration performance of an automotive vehicle to assure safety in braking. In the anti-skid brake control system, a skid control cycle, in which braking pressure is controlled or adjusted so as to avoid excessive wheels slippage due to locking or skidding of wheels, is initiated in response to a wheel deceleration (negative value of acceleration). During anti-skid brake control, braking pressure is adjusted over one or more skid control cycles for maintaining braking pressure in the vicinity of lock pressure to maintain wheel slippage at an optimal level, i.e. 10 to 20%.

In such anti-skid brake control system, it is desirable to timely initiate a skid control cycle for obtaining the optimum brake control performance. For this, a high precision level is required in derivation of wheel acceleration. Higher precision level of wheel acceleration data may permit setting of wheel deceleration threshold which is set for detecting initiation timing of skid cycle when wheel acceleration is decreased. Setting of the wheel deceleration threshold at lower level may delay initiation timing of skid control cycle and thus permit increasing the braking pressure at a higher level. This is clearly desirable for improving vehicular braking performance. However, in usual case, due to error contained in the wheel acceleration data, the wheel deceleration threshold cannot be set at satisfactorily low level.

As will be appreciated, higher precision in derivation of wheel acceleration data can be obtained by expanding period for sampling wheel speed data. For examples, the following United States Patents which have been all assigned to the common assignee disclose relevant technologies in derivation of wheel acceleration data with acceptable precision level for using in the anti-skid brake control.

U.S. Pat. No. 4,683,537, issued on July 28, 1987

On the other hand, in the U.S. Pat. No. 4,683,537 discloses another technology for performing anti-skid brake control. In the invention disclosed in this United States Patent, the peak value of the wheel acceleration data while the wheel speed resumes toward a vehicle body speed and overruns the vehicle body speed, is detected. Based on the detected peak value of the wheel acceleration data during acceleration mode, road surface condition, i.e. road/tire friction level, is detected for adjusting operation in brake pressure increasing mode (hereafter APPLICATION mode) in the succeeding skid control cycle. For this purpose, it is essential to obtain wheel acceleration data with a minimum lag time. Therefore, when the wheel speed data sampling period is set at relatively long period, it necessarily cause; increasing of lag time in detection of the peak value of the wheel acceleration data. In view of required response characteristics in detection of the peak value of the wheel acceleration data, it is desirable to minimize the wheel speed data sampling period.

Therefore, it is desired to achieve both high precision in deriving wheel acceleration data for detecting initiation timing of skid control cycle and higher response characteristics in derivation of the wheel acceleration data for detecting the peak value of the wheel acceleration data.

SUMMARY OF THE INVENTION

Therefore, it is an object of the present invention to provide an anti-skid brake control system which can achieve both satisfactorily high precision level and satisfactorily high response characteristics.

In order to accomplish aforementioned and other objects, an anti-skid brake control system, according to the present invention provides two wheel acceleration deriving circuits. A first wheel acceleration deriving circuit provides a timing for deriving wheel acceleration data with a relatively longer interval, which longer interval is long enough to obtain a good number of wheel speed data for deriving first wheel acceleration with satisfactorily high precision level. On the other hand, a second wheel acceleration deriving circuit provides timing for deriving wheel acceleration data with a relatively shorter interval, which shorter interval is short enough for deriving wheel acceleration data with satisfactorily high response characteristics. The wheel acceleration data derived by the first wheel acceleration data is utilized in detecting timing for switching operational mode of the anti-skid brake control system from an APPLICATION mode or RELEASE mode in which braking pressure is decreased to a HOLD mode in which braking pressure is maintained at constant value. On the other hand, the wheel acceleration data derived by the second wheel acceleration deriving circuit is utilized for detecting a peak value of the wheel acceleration.

According to one aspect of the invention, an anti-skid brake control system for an automotive vehicle, comprises:

a braking circuit including a wheel cylinder for generating braking force for decelerating a vehicular wheel in response to a manual braking operation;

a pressure control valve disposed within the braking circuit for controlling braking force to be generated in the wheel cylinder depending upon the vehicular braking condition, the pressure control valve increasing the braking force in the wheel cylinder in a first mode and decreasing the braking force in the wheel cylinder in a second mode;

a sensor means for monitoring rotation speed of the vehicular wheel to produce a wheel speed indicative signal;

first means for deriving a wheel speed data on the basis of the wheel speed indicative signal;

second means for periodically deriving a first wheel acceleration data having a first precision level and a first lag time;

third means for periodically deriving a second wheel acceleration data having a second precision level and a second lag time, which second precision level is lower than the first precision level and second lag time is shorter than the first lag time; and fourth means responsive to the first wheel acceleration data indicative of wheel deceleration greater than a predetermined wheel deceleration threshold, for initiating skid control cycle in which operation mode of the pressure control valve is selectively controlled between the first mode and second mode so as to maintain wheel slippage at a predetermined optimum value according to a predetermined schedule, the fourth means further detecting a peak value of the second wheel acceleration data and deriving braking pressure increasing rate in the first mode of the pressure control valve.

Preferably, the first means comprises a first wheel speed deriving means for periodically deriving a first wheel speed data with a first higher precision level and a second wheel speed deriving means for periodically deriving a second wheel speed data with a second lower precision level, and the second means derives the first wheel acceleration data based on the first wheel speed data and the third means derives the second wheel acceleration data based on the second wheel speed data.

Practically, the first means periodically derives the wheel speed data, the second means samples a first given number of wheel speed data for deriving the first wheel acceleration data on the basis of a difference of values of the sampled oldest wheel speed data and newest wheel speed data and first interval between timing of derivation of the oldest wheel speed data and the newest wheel speed data, and the third means samples a second given number of wheel speed data for deriving the second wheel acceleration data on the basis of a difference of values of the sampled oldest wheel speed data and newest wheel speed data and an second interval between timing of derivation of the oldest wheel speed data and the newest wheel speed data, the first given number being greater than the second given number and the first interval being greater than the second interval.

Furthermore, the second means derives a first average value of the wheel speed indicative data over a first group of the sampled wheel speed data, which first group contains series of wheel speed data over given number of wheel speed derivation cycles and includes an instantaneous wheel speed data derived in the current wheel speed derivation cycle, and a second average value of the wheel speed indicative data over a second group of the sampled wheel data, which second group contains a series of wheel speed data over given number of wheel speed derivation cycles and includes a wheel speed derived in a wheel speed derivation cycle a predetermined number ahead of the current derivation cycle. In the alternative embodiment, the second means receives the second wheel acceleration data and removes a noise component superimposed on the second wheel acceleration data for producing the first wheel acceleration data.

According to another aspect of the invention, an anti-skid brake control system for an automotive vehicle, comprises:

a braking circuit including first and second wheel cylinders for generating braking force for decelerating first and second vehicular wheels in response to a manual braking operation;

first and second pressure control valves respectively disposed within the braking circuit for controlling braking force to be generated in the wheel cylinder depending upon the vehicular braking condition, each of the first and second pressure control valves increasing the braking force in the wheel cylinder in a first mode and decreasing the braking force in the wheel cylinder in a second mode;

a first wheel speed sensor means for monitoring rotation speed of the first vehicular wheel to produce a first wheel speed indicative signal;

a second wheel speed sensor means for monitoring rotation speed of the second vehicular wheel to produce a second wheel speed indicative signal;

first means for deriving first and second wheel speed data respectively on the basis of the first and second wheel speed indicative signals;

second means for periodically deriving a first wheel acceleration data having a first precision level and a first lag time with respect to each of the first and second wheels;

third means for periodically deriving a second wheel acceleration data having a second precision level and a second lag time, which second precision level is lower than the first precision level and second lag time is shorter than the first lag time with respect to each of the first and second wheels; and fourth means responsive to the first wheel acceleration data indicative of wheel deceleration greater than a predetermined wheel deceleration threshold, for initiating skid control cycles for respective first and second pressure control valves, in which operation mode of the pressure control valve is selectively controlled between the first mode and second mode so as to maintain wheel slippage in a predetermined optimum value according to a predetermined schedule, the fourth means further detecting a peak value of the second wheel acceleration data and deriving braking pressure increasing rate in the first mode of the pressure control valve.

According to a further aspect of the invention, an anti-skid brake control system for an automotive vehicle, comprises:

a braking circuit including a wheel cylinder for generating braking force for decelerating a vehicular wheel in response to a manual braking operation;

a pressure control valve disposed within the braking circuit for controlling braking force to be generated in the wheel cylinder depending upon the vehicular braking condition, the pressure control valve increasing the braking force in the wheel cylinder in a first mode and decreasing the braking force in the wheel cylinder in a second mode;

a sensor means for monitoring rotation speed of the vehicular wheel to produce a wheel speed indicative signal;

first means for deriving a wheel speed data on the basis of the wheel speed indicative signal;

second means for periodically deriving a wheel acceleration data on the basis of the wheel speed data;

third means for deriving a vehicle speed representative value on the basis of the wheel speed data;

fourth means for receiving the vehicle speed representative data and modifying the received data for producing a modified vehicle speed representative value fifth means for receiving a vehicle speed representative value from the third means and the modified vehicle speed representative value for selecting greater one of the received values to output as a vehicle speed representative data; and sixth means responsive to the wheel acceleration data indicative of wheel deceleration greater than a predetermined wheel deceleration threshold, for initiating skid control cycle in which operation mode of the pressure control valve is selectively controlled between the first mode and second mode so as to maintain wheel slippage in a predetermined optimum value according to a predetermined schedule on the basis of the wheel speed and the vehicle speed representative data.

Preferably, the second means comprises a first wheel acceleration deriving means for deriving a first wheel acceleration with a first higher precision level and a first longer lag time, and a second wheel deriving means for deriving a second wheel acceleration with a second lower precision level and shorter lag time. Furthermore, the sixth means further detects a peak value of the second wheel acceleration data and derives braking pressure increasing rate in the first mode of the pressure control valve.

BRIEF DESCRIPTION OF THE DRAWINGS

The present invention will be understood from the detailed description given below and from the accompanying drawings of the preferred embodiments of the invention, which, however, should not be taken to limit the invention to the specific embodiments but are for explanation and understanding only.

In the drawings.

DESCRIPTION OF THE PREFERRED EMBODIMENT

Figure 1A:
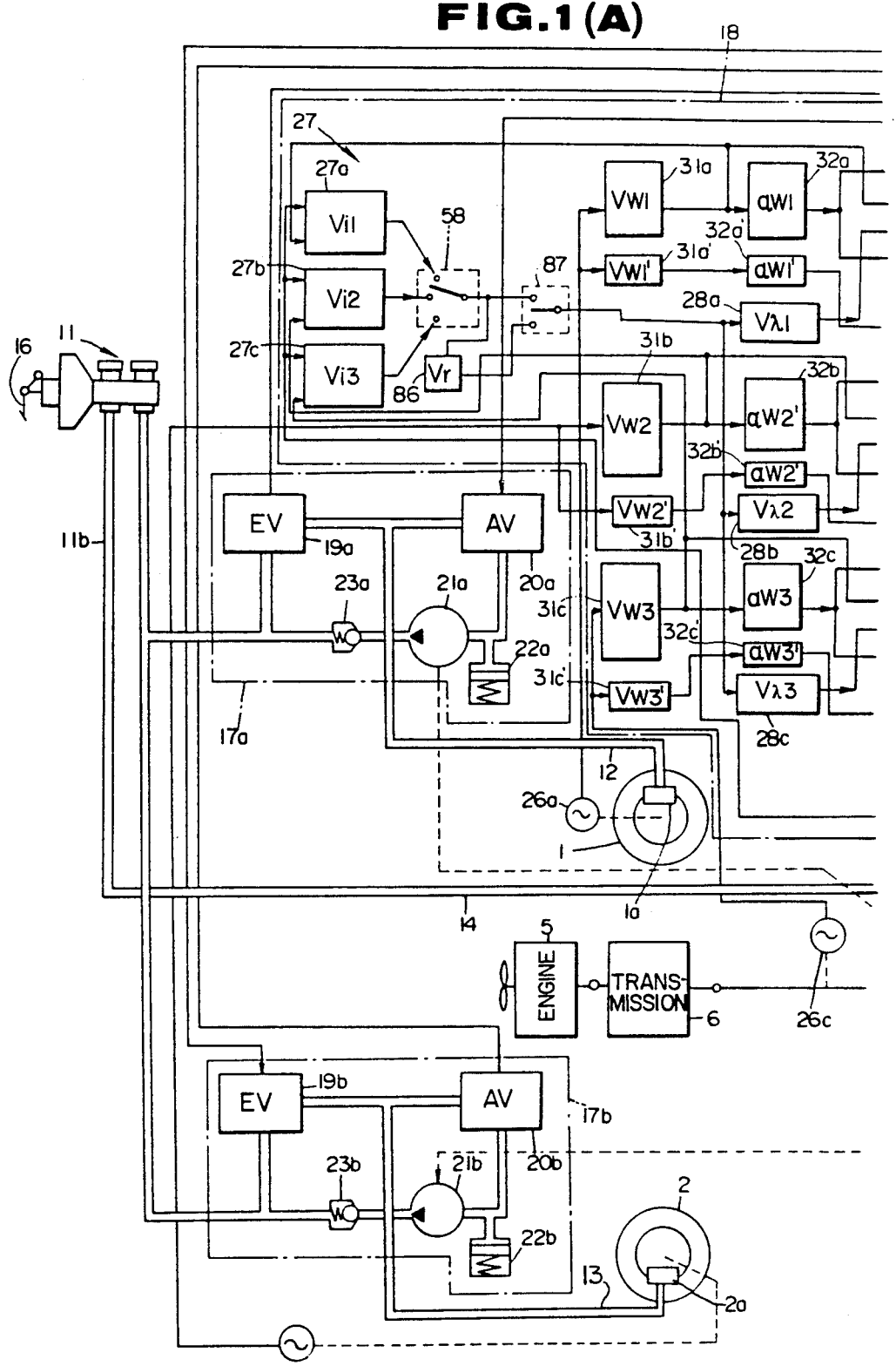
FIGS. 1(A) and 1(B) are block diagrams of an overall wheel slip control system, to which the preferred embodiment of a vehicle speed representing value derivation system according to the invention, applied.
Figure 1B:
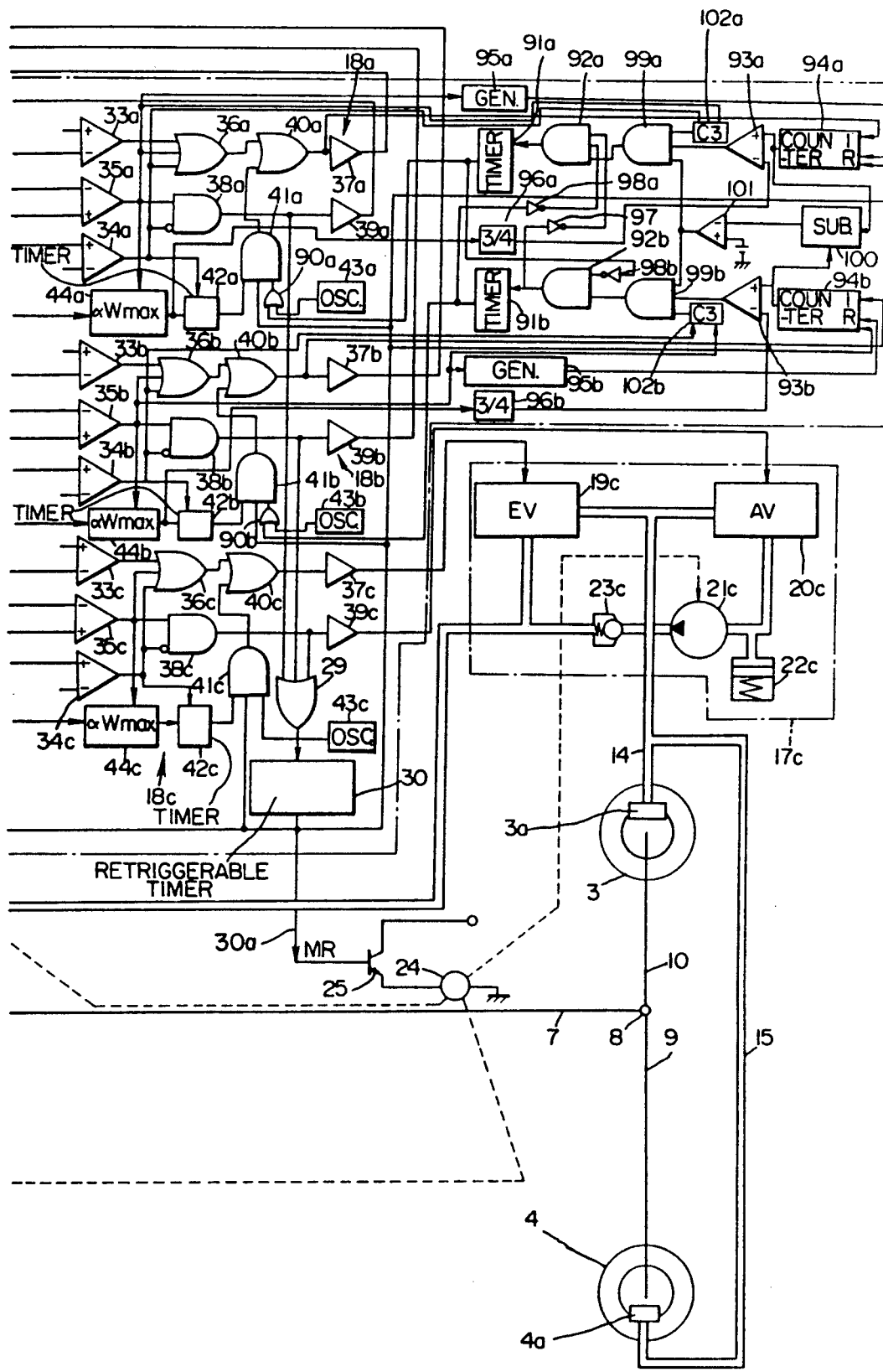

Referring now to the drawings, particularly to FIG. 1, a wheel slip control system is designed for controlling wheel slip at respective front-right, front-left, rear-right and rear-left wheels 1, 2, 3 and 4. Each of the front-right, front-left, rear-right and rear-left wheels 1, 2, 3 and 4 are co-operated with wheel cylinders 1a, 2a, 3a and 4a for to be applied braking force therethrough. On the other hand, the rear wheels 3 and 4 are connected to an automotive engine 5 through a power train constituted by a transmission 6, a propeller shaft 7, a differential gear unit 8 and drive shafts 9 and 10.

In the shown embodiment, the wheel slip control system controls braking force to be exerted to each wheel cylinders for performing anti-skid brake control for preventing the wheels from skidding. On the other hand, the wheel slip control system controls engine output torque or driving torque distribution to the driven rear wheels 3 and 4 so as to prevent the wheels from causing wheel-spin and to provide better tire/road traction. The engine output torque control or power distribution control may be performed by adjusting throttle valve angular position by means of throttle valve servo systems, such as that disclosed in British Patent First Publications Nos. 2,154,763 and 2,154,765. The disclosure of the above-identified British Patent First Publications are herein incorporated by reference for the sake of disclosure. Furthermore, traction control systems for adjusting driving torque to be exerted on the driven wheels of the vehicle have been disclosed in the co-pending U.S. Pat. Application Ser. No. 903,474, filed on Sept. 4, 1986, assigned to the common assignee to the present invention. The disclosure of the above-identified co-pending U.S. Patent Application is also herein incorporated by reference for the sake of disclosure. Also, the following U.S. Patents disclose the relevant technologies closely related to the context of the present invention. The disclosure of the below listed U.S. Patents are also herein incorporated by reference for the sake of disclosure.

U.S. Pat. No. 4,662,686, issued on May 5, 1987
U.S. Pat. No. 4,667,176, issued on May 19, 1987
U.S. Pat. No. 4,597,052, issued on June 24, 1986
U.S. Pat. No. 4,637,663, issued on Jan. 20, 1987
U.S. Pat. No. 4,683,537, issued on July 28, 1987
U.S. Pat. No. 4,408,290, issued on Oct. 4, 1983
U.S. Pat. No. 4,674,049, issued on June 16, 1987
U.S. Pat. No. 4,704,684, issued on Nov. 3, 1987
U.S. Pat. No. 4,663,715, issued on May 5, 1987
U.S. Pat. No. 4,663,716, issued on May 5, 1987
U.S. Pat. No. 4,660,146, issued on Apr. 21, 1987
U.S. Pat. No. 4,665,491, issued on May 12, 1987
U S. Pat. No. 4,780,818, issued on Oct. 25, 1988
U.S. Pat. No. 4,674,050, issued on June 16, 1987
U.S. Pat. No. 4,680,714, issued on July 14, 1987
U.S. Pat. No. 4,682,295, issued on July 21, 1987
U.S. Pat. No. 4,680,713, issued on July 145, 1987
U.S. Pat. No. 4,669,046, issued on May 26, 1987
U.S. Pat. No. 4,669,045, issued on May 26, 1987
U.S. Pat. No. 4,679,146, issued on July 7, 1987
U.S. Pat. No. 4,656,588, issued on April 7, 1987

U.S. Pat. No. 4,718,013, issued on Jan. 5, 1988
U.S. Pat. No. 4,569,560, issued on Feb. 11, 1986

In the shown embodiment, a hydraulic brake system for applying braking fluid pressure to respective wheel cylinders 1a, 2a, 3a and 4a includes separated two hydraulic circuits 12 and 14. One of the hydraulic circuit 12 connects one of outlet ports of a master cylinder 11 to front-right wheel cylinder 1a which is associated with the front-right wheel 1. The hydraulic circuit 12 includes a branch circuit 13 connecting the one of the outlet port of the master cylinder 11 to the front-left wheel cylinder 2a of the front-left wheel 2. The other outlet port of the master cylinder 11 is connected to the rear-right wheel cylinder 3a and, through a branch circuit 15, to the rear-left wheel cylinder 4a. As is well known, the master cylinder 11 is mechanically coupled with a brake pedal 16 for building-up braking fluid pressure depending upon magnitude of depression of the brake pedal. The braking fluid pressure built up in the master cylinder 11 is distributed to respective wheel cylinders 1a, 2a, 3a and 4a through the circuits 12, 13, 14 and 15 for exerting braking force to respectively associated wheels 1, 2, 3 and 4.

Anti-skid brake control valves assemblies 17a and 17b and 17c are disposed in the circuits 12, 13 and 14. As will be seen from FIG. 1(A) and 1(B), the anti-skid brake control valve assembly 17c is positioned upstream of the junction between the circuits 14 and 15. Therefore, braking fluid pressure to be exerted to the rear wheel cylinders 3a and 4a is commonly controlled by means of the anti-skid brake control valve assembly 17c. On the other hand, the anti-skid brake control valves 17a and 17b are respectively disposed in the circuits 12 and 13 at the positions downstream of the junction of the circuits 12 and 13. Therefore, the valves 17a and 17b controls braking fluid pressures at associated wheel cylinders 1a and 2a, independently of each other.

The anti-skid brake control valve assemblies 17a, 17b and 17c have mutually identical constructions to each other. Therefore, it would not be necessary to give detailed description of the constructions for the valve assemblies 17a, 17b and 17c, respectively. In order to avoid redundant recitation and avoid confusion in understanding the invention, the construction of only anti-skid brake control valve assembly 17a will be described below. The constructions of the valve assemblies 17b and 17c should be understood as identical to that of the valve assembly 17a set out below.

The anti-skid brake control valve assembly 17a includes an inlet (EV) valve 19a, outlet (Av) valve 20a, a fluid pump 21a, accumulator 22a and one-way check valve 23a. The inlet valve 19a has an inlet port connected to the associated outlet port of the master cylinder 11 via the hydraulic circuit 12 and an outlet port connected to the front-right wheel cylinder 1a. On the other hand, the Av valve 20a has an inlet port connected to the wheel cylinder 1a and an outlet port connected to the accumulator 22a. The accumulator 22a is further connected to the hydraulic circuit 12 via the fluid pump 21a and the one-way check valve 23a for feeding back excessive fluid pressure therethrough. The fluid pump 23a is designed to draw the pressurized fluid in the associated wheel cylinder 1a to quickly reduce the braking pressure in the wheel cylinder while the anti-skid brake control is performed.

The EV valve 19a is controlled as to valve position by an inlet control signal $EV_1$ from a control unit 18 between a closed position and open position. Similarly, the AV valve 20a is controlled as to valve position by an outlet control signal $AV_1$ from the control unit 18 between a closed position and open position. Furthermore, the fluid pump 21a is connected to the control unit 18 to receive a pump drive signal MR 30a to control its operation between a driving condition and resting condition.

In the preferred embodiment, the EV valve 19a is in the open position while the inlet control signal $EV_1$ is LOW level. On the other hand, the AV valve 20a is in the closed position while the outlet control signal $AV_1$ is LOW level. The anti-skid brake control valve assembly 17a is operable in APPLICATION mode, RELEASE mode and HOLD mold. In the APPLICATION mode, the inlet control signal $EV_1$ is held LOW to maintain the EV valve 19a in open position. At the same time, the outlet control valve $AV_1$ is also held LOW to maintain the AV valve 20a in the closed position. Therefore, the outlet port of the master cylinder 11 is connected to the wheel cylinder 1a through the hydraulic circuit 12 and the EV valve 19a. Therefore, the braking fluid pressure in the wheel cylinder 1a is increased proportionally to that built-up in the master cylinder. On the other hand, in the RELEASE mode, the inlet control signal $EV_1$ is switched into HIGH level to operate the EV valve 19a at the closed position. This shuts off the fluid communication between the outlet port of the master cylinder 11 and the wheel cylinder 1a therethrough. On the other hand, at this time, the outlet control signal $AV_1$ also becomes HIGH level to open the AV valve 20a. As a result, fluid communication between the wheel cylinder 1a and the accumulator 22a is established. At the same time, the pump drive signal MR 30a turns into HIGH to drive the fluid pump 21. Therefore, the fluid pressure in the accumulator 22a becomes lower than that in the wheel cylinder 1a. Therefore, the braking fluid in the wheel cylinder 1a is drawn into the pressure accumulator.

On the other hand, in the HOLD mode, the inlet control signal $EV_1$ is set to HIGH level to close the EV valve 19a and the outlet control signal $AV_1$ is set to LOW level to maintain the AV valve 20a at closed position. Therefore, the wheel cylinder 1a is blocked for fluid communication from the master cylinder 11 and the accumulator 22a. Therefore, the fluid pressure in the wheel cylinder 1a is held constant. The relationship of the inlet and outlet control signals $EV_1$ and $AV_1$ and the pump drive signal MR 30a will be clearly seen from the following table:

TABLE

|  | APPLICATION | RELEASE | HOLD |
|---|---|---|---|
| $EV_1$ | LOW | HIGH | HIGH |
| $AV_1$ | LOW | LOW | HIGH |
| MR | — | — | HIGH |

The control unit 18 is connected to a wheel speed sensor 26a for receiving a pulse signal having frequency proportional to the rotation speed of the associated wheel 1. In practice, the wheel speed sensor 26 comprises a sensor rotor adapted to rotate with the vehicle wheel and a sensor assembly fixedly secured to the shim portion of the knuckle spindle. The sensor rotor is fixedly secured to a wheel hub for rotation with the vehicle wheel. The sensor rotor may be formed with a plurality of sensor teeth at regular angular intervals. The width of the teeth and the grooves therebetween are preferably equal to each other and define a unit angle of wheel rotation. The sensor assembly comprises a magnetic core aligned with north pole near the sensor rotor and south pole distal from the sensor rotor. A metal element with a smaller diameter section is attached to the end of the magnetic core near the sensor rotor. The free end of the metal element faces the sensor teeth. An electromagnetic coil encircles the smaller diameter section of the metal element. The electromagnetic coil is adapted to detect variation in the magnetic field generated by the magnetic core to produce an alternating-current sensor signal. Namely, the metal element and the magnetic core form a kind of proximity switch which adjusts the magnitude of the magnetic field depending upon the distance between the free end of the metal element and the sensor rotor surface. Thus, the intensity of the magnetic field fluctuates in relation to the passage of the sensor teeth and accordingly in relation to the angular velocity of the wheel.

Such wheel speed sensor has been disclosed in U.S. Pat. No. 4,597,052, issued on June 24, 1986, for example. The disclosure of the U.S. Pat. No. 4,597,052 is herein incorporated by reference for the sake of disclosure.

The control unit 18 has a controller circuit section 18a for performing wheel slip control for the right-front wheel 1. Similarly, the control unit 18 has controller circuit sections 18b and 18c respectively adapted to perform wheel slip control for respectively associated left-front wheel 2 and rear wheels 3 and 4. The controller circuit section 18a receives the wheel speed indicative pulse signal from the wheel speed sensor 26a. Similarly, the controller circuit section 18b receives a wheel speed indicative pulse signal from a wheel speed sensor 26b which monitors rotation speed of the left-front wheel 2. A wheel speed sensor 26c is connected to the controller circuit section 18c for inputting wheel speed indicative pulse signal, which monitors average rotation speed of the rear wheels 3 and 4. In order to monitor the average speed of the rear wheels, the wheel speed sensor 26c is coupled with the propeller shaft 7 for monitoring rotation speed thereof as the average rotation speed of the rear wheels. As with the anti-skid brake control valves 17a, 17b and 17c, the controller circuit sections 18a, 18b and 18c are essentially the identical circuit constructions to each other. Therefore, the following discussion will be given only for the controller circuit section 18a. The corresponding circuit elements in the controller circuit sections 18b and 18c are represented by the same reference numerals with different suffixes which identifies the section to include the circuit elements.

As will be seen from FIG. 1, the controller circuit section 18a includes a wheel speed derivation circuit 31a and a wheel acceleration derivation circuit 32a. The controller circuit section 18a also includes another wheel speed derivation circuit 31a' and another wheel acceleration derivation circuit 32a'. The wheel speed derivation circuits 31a and 31a' are of the identical construction to each other. The wheel speed derivation circuits 31a and 31a' receive the wheel speed indicative pulse signal or alternating current form frequency signal from the wheel speed sensor 26a. Based on the frequency or pulse period of the wheel speed indicative pulse signal or alternating current signal of the wheel speed sensor 26a and rotation radius of the right-front wheel, the wheel speed derivation circuit 31a derives an angular velocity of the right-front wheel and whereby derives an instantaneous wheel speed $Vw_1$ of the right-front wheel 1.

Figure 2:
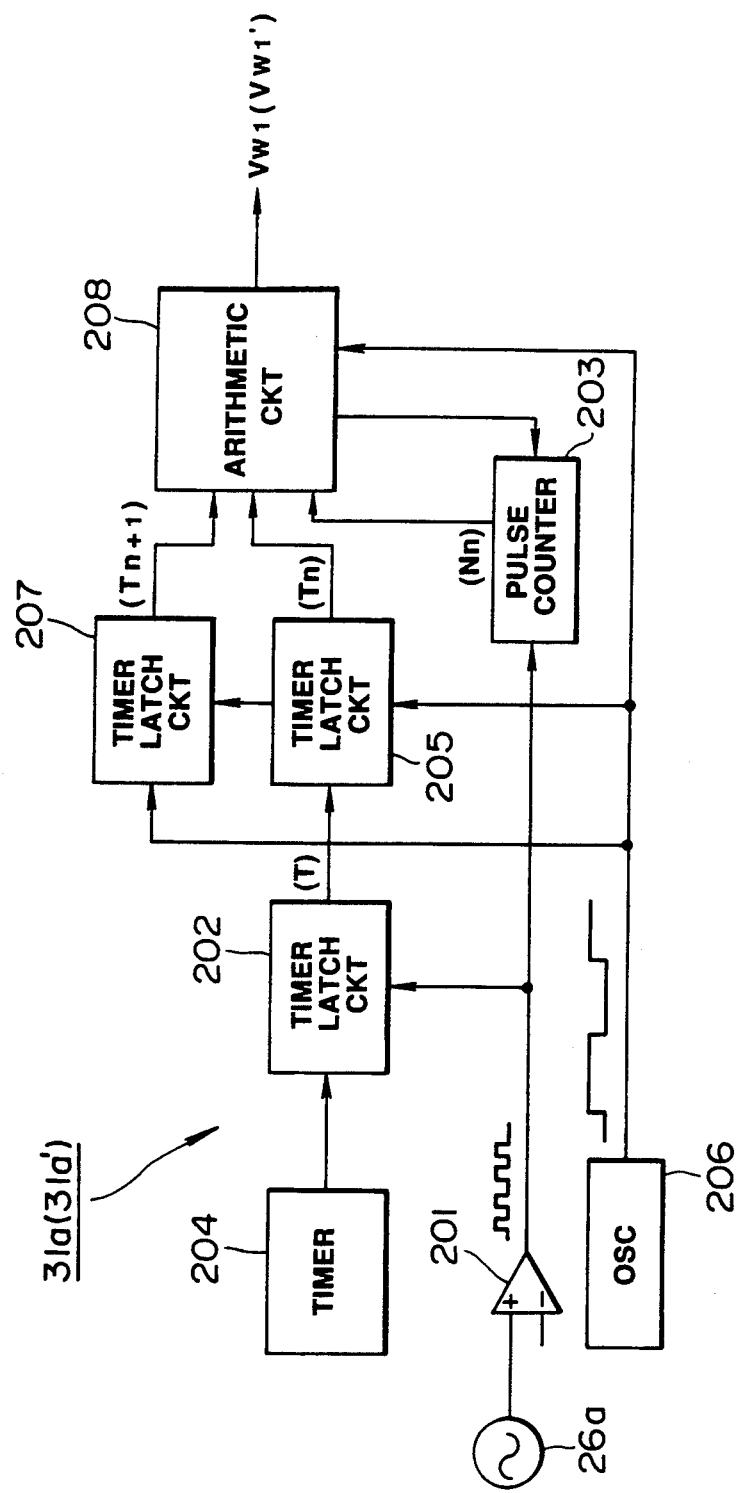
FIG. 2 is a block diagram of a wheel speed derivation circuit employed in the preferred embodiment of the anti-skid brake control system of FIG. 1.

In the shown embodiment, each of the wheel speed derivation circuits 31a and 31a' is constructed as illustrated in FIG. 2. As can be seen from FIG. 2, the wheel speed derivation circuit 31a or 31a' comprises a comparator 201 which is connected to the wheel speed sensor 26a at the non-inverting input terminal to receive the alternating current form of the frequency signal. The inverting input terminal of the comparator 201 is connected to a reference level source to compare the frequency signal level with the reference level so as to produce a rectangular pulse train having the frequency corresponding to the alternating current form of the frequency signal. The output terminal of the comparator 201 is connected to a pulse counter 203 to deliver the rectangular pulse train. The pulse counter 203 counts up the pulses in the pulse train fed from the comparator 201 to output a pulse counter value Nn indicative of the counted value.

The wheel speed derivation circuit 31a or 31a' also has a timer latch circuit 202 which also receives the pulse train output from the comparator 201. The timer latch circuit 202 is also connected to a timer 204 to receive timing data T from the latter. The timer latch circuit 202 is responsive to the leading edge of the HIGH level pulse to latch the instantaneous timing data input from the timer 204. The timer latch circuit 202 is also connected to another timer latch circuit 205 to feed the latched timing data. The timer latch circuit 205 is also connected to an oscillator 206 to receive therefrom a rectangular pulse having a predetermined frequency. As seen from FIG. 2, the pulse period of the rectangular pulse generated by the oscillator 206 is set to be much longer than the pulse width of the wheel speed indicative pulse train output from the comparator 201. The timer latch circuit 205 is triggered by the leading edge of the HIGH level rectangular pulse from the oscillator 206 to latch the timing data T fed from the timer latch circuit 202 as a current timing data Tn. As will be appreciated, the current timing data Tn is thus updated with an interval corresponding to the pulse period of the rectangular pulse fed from the oscillator 206. Simultaneously to latching the timing data from the timer latch circuit 202, the timer latch circuit 205 transfers the timing data Tn latched at the immediately preceding latching timing, i.e. the timing of occurrence of the leading edge of the immediately preceding HIGH level pulse, to a timer latch circuit 207 as an immediately preceding timing data Tn+1.

The timer latching circuits 205 and 207 are connected to an arithmetic circuit 208 to feed the current timing data Tn and immediately preceding timing data Tn+1. Also, the pulse counter 203 is connected to the arithmetic circuit 208 to feed the pulse counter value Nn. The arithmetic circuit 208 is also connected to the oscillator 206 to receive therefrom the rectangular pulse. The arithmetic circuit 208 is triggered by the leading edge of the rectangular pulse to perform an arithmetic operation for deriving wheel speed data $Vw_n$ according to the following equation:

$$Vw_n = (K \times Nn)/(Tn - Tn+1)$$

where K is constant At the time of completion of derivation of the wheel speed data $Vw_n$, the arithmetic circuit 208 feeds a reset signal to the pulse counter 203 to reset the latter.

It should be appreciated that the constant K is variable depending upon the radius of the wheel.

Figure 3:
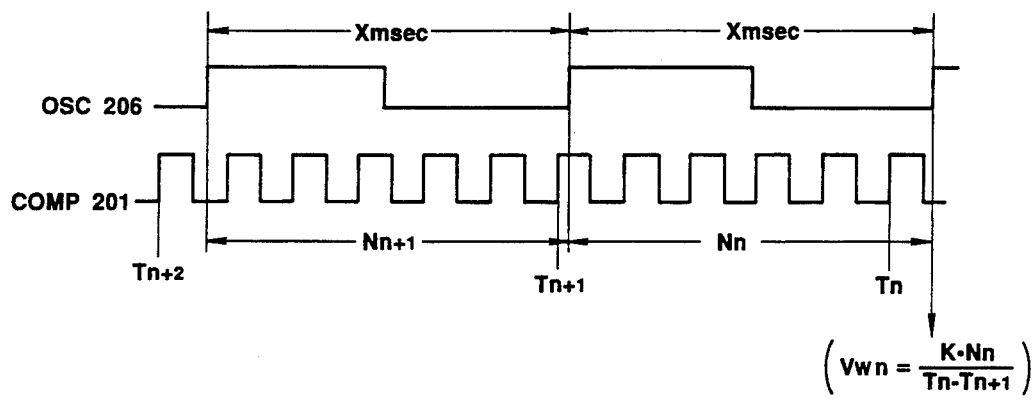
FIG. 3 is a timing chart showing waveforms of signals generated in the wheel speed derivation circuit of FIG. 2.

Although the wheel speed derivation circuits 31a and 31a' are constructed into the identical construction as set forth above, the pulse period of the rectangular pulses produced by respective oscillators 206 are different from each other. For instance, as shown in FIG. 3, the pulse period X msec of the rectangular pulse to be produced in the wheel speed derivation circuit 31a is set at a period e.g. 10 msec., twice longer than the pulse period, e.g. 5 msec., of the rectangular pulse in the wheel speed derivation circuit 31a'. Therefore, the wheel speed data Vw derived by the wheel speed derivation circuit 31a has higher precision and greater lag time. On the other hand, the wheel speed data Vw' derived by the wheel speed derivation circuit 31a' has lower precision level but smaller lag time. The wheel speed derivation circuits 31a and 31a' output wheel speed indicative signals Vw and Vw' to be fed to respectively associated wheel acceleration derivation circuits 32a and 32a'.

The wheel acceleration derivation circuits 32a and 32a' receive the wheel speed signals Vw and Vw' from the wheel speed derivation circuits 31a and 31a'. The wheel acceleration derivation circuits 32a and 32a' derive wheel accelerations $\alpha w_1$ and $\alpha w_1'$ and produce a wheel acceleration indicative signals. In the shown embodiment, the wheel acceleration derivation circuit 32a samples a greater number of wheel speed data Vw derived by the wheel speed derivation circuit 31a and derives the wheel acceleration $\alpha w_1$ based on the sampled wheel speed data $Vw_1$. In the practical embodiment, the wheel acceleration derivation circuit 32a is designed for sampling six (6) wheel speed data $Vw_1$. On the other hand, the wheel acceleration derivation circuit 32a' samples a smaller number of wheel speed data $Vw_1'$ derived by the wheel speed derivation circuit 31a' and derives the wheel acceleration $\alpha w_1'$ based on the sampled wheel speed data $Vw_1'$. In the practical embodiment, the wheel acceleration derivation circuit 32a' is designed for sampling four (4) wheel speed data $Vw_1'$.

Derivation of the wheel accelerations $\alpha w_1$ and $\alpha w_1'$ based on the variation of wheel speed $Vw_1$ and $Vw_1'$ indicated in the wheel speed signals, can be performed by differentiating the differences of the wheel speeds input at different and consecutive timing. Otherwise, the wheel acceleration may be derived directly from the wheel speed indicative pulse signal from the wheel speed sensor 26a in a manner disclosed in the aforementioned U.S. Pat. No. 4,597,052.

Figure 4:
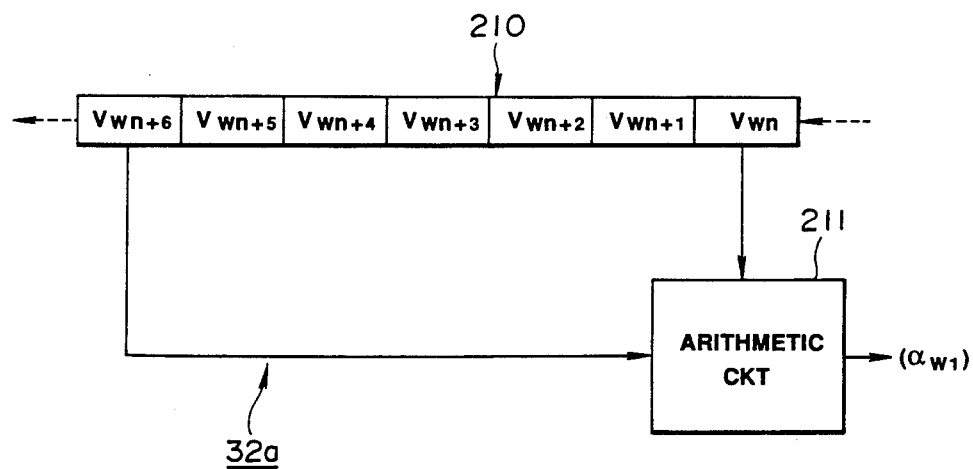
FIGS. 4 and 5 are block diagrams of wheel acceleration deriving circuits employed in the preferred embodiment of the anti-skid brake control system of FIG. 1.
Figure 5:
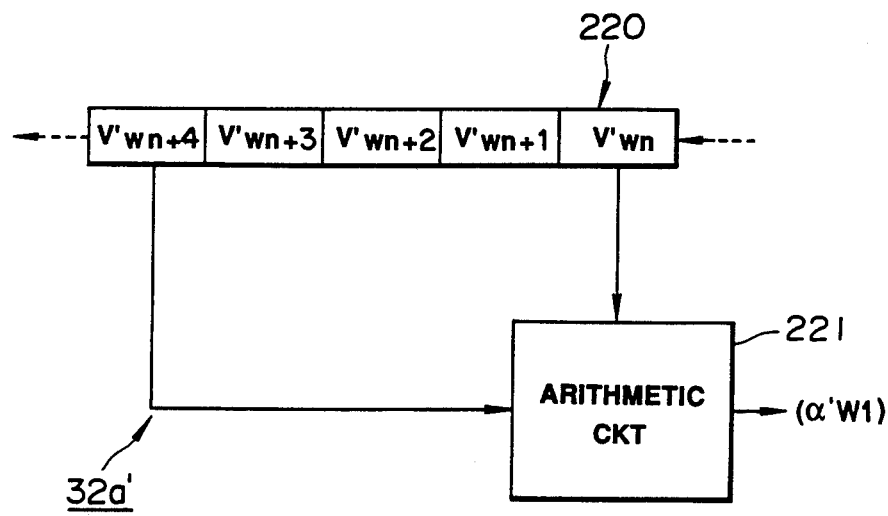

FIG. 4 shows a practical construction of the wheel acceleration derivation circuit 32a. The wheel acceleration derivation circuit 32a has a shift register 210 having six memory blocks for temporarily storing the wheel speed data Vw and shifting the stored data in order. In the shift register 210, six wheel speed data including the current wheel speed data $Vw_n$ and the six cycles preceding wheel speed data $Vw_{n+6}$. The wheel acceleration derivation circuit 32a also Includes an arithmetic circuit 211 to derive a difference between the current wheel speed data $Vw_n$ and the six cycles preceding wheel speed data $Vw_{n+6}$ and the known period (X msec×6:10 msec×6=60 msec). On the other hand, as shown in FIG. 5, the wheel acceleration derivation circuit 32a' has a shift register 220 having four memory blocks for temporarily storing the wheel speed data Vw' and shifting the stored data in order. In the shift register 220, four wheel speed data including the current wheel speed data $Vw_n'$ and the four cycles preceding wheel speed data $Vw_{n+4}'$. The wheel acceleration derivation circuit 32a' also includes an arithmetic circuit 221 to derive a difference between the current wheel speed data $Vw_n'$ and the four cycles preceding wheel speed data $Vw_{n+4}'$ and the known period (X msec×4:5 msec×4=20 msec). The wheel acceleration deriving circuit 32a thus derives wheel acceleration $\alpha w_1$ with high precision and with greater lag time and outputs the wheel acceleration indicative signal. On the other hand, the wheel acceleration derivation circuit 32a' derives wheel acceleration $\alpha w_1'$ with low precision and smaller lag time and outputs the wheel acceleration indicative signal.

As shown in FIG. 1, the wheel acceleration indicative signal of the wheel acceleration derivation circuit 32a is transmitted to comparators 33a and 34a. In order to receive the wheel acceleration indicative signal, the comparator 33a is connected to the wheel acceleration derivation circuit 32a at an inverting input terminal. On the other hand, the comparator 34a is connected to the wheel acceleration derivation circuit 32a at a non-inverting input terminal thereof for receiving the wheel acceleration indicative signal therethrough. The wheel acceleration derivation circuit 32a' is connected to a peak detector circuit 44a which is designed for detecting a peak value of the wheel acceleration $\alpha w_1'$ and holds the peak value.

The non-inverting input terminal of the comparator 33a is connected to a reference signal generator (not shown) for receiving therefrom a deceleration threshold indicative reference signal −b. The deceleration threshold indicative reference signal has a value representative of a predetermined deceleration threshold to be compared with the wheel acceleration value $\alpha w_1$. The comparator 33a normally outputs a LOW level comparator signal as long as the wheel acceleration $\alpha w_1$ is maintained higher than the deceleration threshold −b. The comparator 33a is responsive to the wheel acceleration $\alpha w_1$ dropping across the deceleration threshold −b to output a HIGH level comparator signal.

The inverting input terminal of the comparator 34a is connected to a reference signal generator (not shown) which generates an acceleration threshold indicative reference signal having a value indicative of a predetermined wheel acceleration threshold +a. The comparator 34a thus compares the wheel acceleration awl as indicated in the wheel acceleration indicative signal of the wheel acceleration derivation circuit 32a with the wheel acceleration threshold +a. The comparator 34a generally outputs a LOW level comparator signal while the wheel acceleration $\alpha w_1$ is held lower than the wheel acceleration threshold +a. The comparator 34a produces a HIGH level comparator signal when the wheel acceleration $\alpha w_1$ rises across the wheel acceleration threshold.

Another comparator 35a is provided in the controller circuit section 18a. The comparator 35a has an inverting input terminal connected to the wheel speed derivation circuit 31a for receiving therefrom the wheel speed signal. The comparator 35a also has a non-inverting input terminal connected to a target wheel speed derivation circuit 28a. The target wheel speed derivation circuit 28a generally derives a target wheel speed Vλ on the basis of a vehicle speed representing value Vi and a desired optimum wheel slippage for optimizing vehicular braking efficiency. As is well known, the vehicular braking efficiency becomes maximum in a wheel slippage range of 10% to 20%. In the practical embodiment, the target wheel slippage λ is set at 15%. On the other hand, the vehicle speed representing value Vi is derived on the basis of an instantaneous wheel speed Vw at the beginning of each cycle of anti-skid brake control. The procedure of derivation of the vehicular speed representing value Vi discussed later. The target wheel speed Vλ is derived at a value of 85% of the vehicle speed representing value Vi to indicate 15% of wheel slippage. The comparator 35a maintains a LOW level comparator signal while the wheel speed Vw is maintained higher than the target wheel speed Vλ. On the other hand, the comparator signal level of the comparator 35a turns HIGH when the wheel speed Vw drops across the target wheel speed Vλ.

The comparator signals of the comparators 33a and 34a and 35a are fed to input terminals of an OR gate 36. The comparator 34a and 35a are also connected to an AND gate 38 to feed the comparator signals. The AND gate 38a has an inverting input terminal connected to the comparator 35a to receive therefrom the comparator signal. The comparator 35a is further connected to a variable timer circuit 42a which will be described later.

The output terminal of the OR gate 36a is connected to one input terminal of an OR gate 40a. The other input terminal of the OR gate 40a is connected to an AND gate 41a. The AND gate 41a has one input terminal connected to the variable timer 42a. Another input terminal of the AND gate 41a is connected to the output terminal of an OR gate 90a. The OR gate 90a has one input terminal connected to a timer 91a of a synchronous locking detector circuit, which timer 91a serves as delay circuit for providing delay to operate the anti-skid brake control valve 17a into the APPLICATION mode. Operation of the timer 91a add the associated circuit thereof will be described in detail later. The other input terminal of the OR gate 90a is connected to an oscillator 43a which serves as a clock generator. The other input terminal of the AND gate 41a is connected to a retriggerable timer circuit 30 which is designed for producing a pump drive signal MR 30a for driving the fluid pump 21a, 21b and 21c by applying the pump drive signal MR 30a to pump drive motor 24 through a switching transistor 25.

A vehicle speed representing value derivation circuit 27a is connected to the wheel speed derivation circuit 31a to receive therefrom the wheel speed signal from time-to-time. The vehicle speed representing value derivation circuit 27a is also connected to the retriggerable timer circuit 30. The vehicle speed representing value derivation circuit 27a is designed to latch an instantaneous wheel speed Vw as an initial vehicle speed representing value $Vi_1$ in response to the leading edge of a HIGH level timer signal serving as the pump drive signal MR. The vehicle speed representing value derivation circuit 27a derives the vehicle speed representing value $Vi_1$ on the basis of the initial vehicle speed representing value corresponding to the latched wheel speed value $Vw_1$ as set forth above.

The vehicle speed representing value derivation circuit 27a is associated with other vehicle speed representing value derivation circuits 27b and 27c which derive the vehicle speed representing values $Vi_2$ and $Vi_3$ with respect to respectively associated left front wheel 2 and rear wheels 3 and 4, in order to form the preferred embodiment of a vehicle speed representing value derivation system 27. The vehicle speed representing value derivation system 27 also includes a select-HIGH switch 58 having three terminals respectively connected to the vehicle speed representative value derivation circuits 27a, 27b and 27c. The select-HIGH switch 58 selects the greatest value among three vehicle speed representing values $Vi_1$, $Vi_2$ and $Vi_2$ from respective vehicle speed representing value derivation circuits 27a, 27b and 27c and outputs the selected value as a common vehicle speed representing value Vi. The common vehicle speed representing value Vi is transferred to respective target wheel speed derivation circuits 28a, 28b and 28c in the controller circuit sections 18a, 18b and 18c so that the target wheel derivation circuits will be able to derive the target wheel speeds $Vλ_1$, $Vλ_2$ and $Vλ_3$ based thereon.

The preferred embodiment of the anti-skid brake control system, according to the present invention is adapted to prevent the front wheels, i.e. right-front wheel 1 and the left-front wheel 2 from synchronously locking. Therefore, the synchronous locking detector circuit is provided for detecting synchronous lock at right- and left front wheels 1 and 2. The synchronous lock detector circuit is thus associated with the controller circuit sections 18a and 18b. The synchronous lock detector circuit includes counters 94a and 94b. The input of counter 94a is connected to the output terminal of the OR gate 40a. The counter 94b is triggered by LOW level gate signal from the OR gate 40a to count-up an internal clock for increasing the counter value thereof according to the length of period to maintain the anti-skid brake control valve 17a in APPLICATION mode. On the other hand, the counter 94a is connected to a shot pulse generator 95a to receive therefrom a reset pulse at its reset input terminal to clear the counter value in response to the reset pulse. The shot-pulse generator 95a is, in turn, connected to the output terminal of the comparator 35a to be triggered by the trailing edge of the HIGH level comparator signal therefrom. Similarly, the input of counter 94b is connected to the output terminal of the OR gate 40b. The counter 94b is triggered by LOW level gate signal from the OR gate 40b to count-up an internal clock for increasing the counter value thereof according to the length of period to maintain the anti-skid brake control valve 17b in APPLICATION mode. On the other hand, the counter 94b is connected to a shot pulse generator 95b to receive therefrom a reset pulse at its reset input terminal to clear the counter value in response to the reset pulse. The shot-pulse generator 95b is, in turn, connected to the output terminal of the comparator 35b to be triggered by the trailing edge of the HIGH level comparator signal therefrom.

The counter 94a is connected to the non-inverting input terminal of a comparator 93a and a subtracting circuit 100. The inverting input terminal of the comparator 93a is connected to the peak hold circuit 44a through a ¾ multiplier 96a to receive a ¾ multiplied peat value indicative signal. Similarly, the counter 94b is connected to the non-inverting input terminal of a comparator 93b and a subtracting circuit 100. The inverting input terminal of the comparator 93b is connected to the peak hold circuit 44b through a ¾ multiplier 96b to receive a ¾ multiplied peak value indicative signal.

The output terminal of the comparator 93a is connected to one input terminal of an AND gate 99a. Another input terminal of the AND gate 99a is connected to a wheel speed drop-rate detector circuit 102a. The wheel speed drop-rate detector circuit 102a is connected to comparators 34a and 35a to receive therefrom the comparator signals. The other input terminal of the AND gate 99a is connected to the output terminal of a comparator 101 which receives the output of the subtractor circuit 100 at its inverting input terminal. A reference value signal is applied to the non-inverting input terminal of the comparator 101. The output terminal of the AND gate 99a is connected to one input terminal of an AND gate 92a. Another input terminal of the AND gate 92a is connected to the output terminal of the timer 91b via an inverter 98a. The other input terminal of the AND gate 92a is connected to the output terminal of an AND gate 92b via an inverter 97. The AND gate 92b has an output terminal connected to the timer 91b.

The wheel speed drop-rate detector circuit 102a is designed for detecting variation rate of the rotation speed of the right-front wheel 1a and compares the derived variation rate with a predetermined value to produce a HIGH level detector signal $c_3$ when the variation rate is smaller than or equal to the predetermined value.

The output terminal of the comparator 93b is connected to one input terminal of an AND gate 99b. Another input terminal of the AND gate 99b is connected to a wheel speed drop-rate detector circuit 102b. The wheel speed drop-rate detector circuit 102b is connected to comparators 34b and 35b to receive therefrom the comparator signals. The other input terminal of the AND gate 99b is connected to the output terminal of the comparator 101. The output terminal of the AND gate 99b is connected to one input terminal of an AND gate 92b. The other input terminal of the AND gate 92b is connected to the output terminal of the timer 91a via an inverter 98b.

Figure 6:
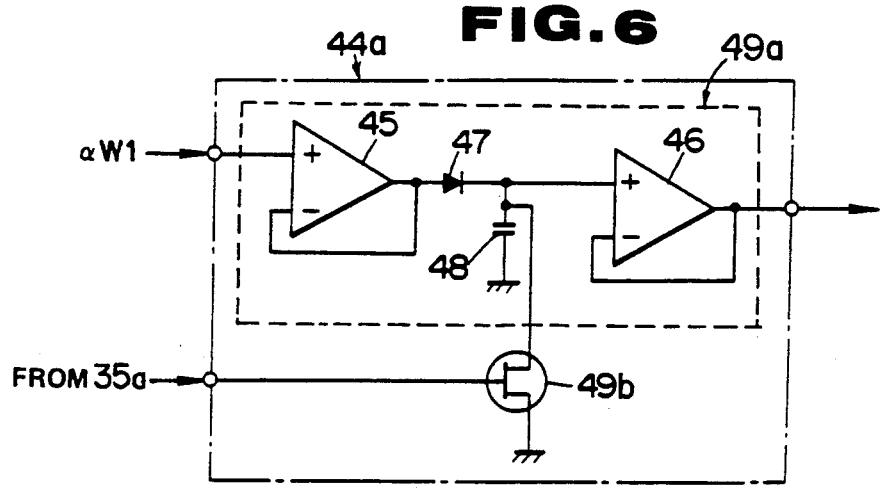
FIG. 6 is a circuit diagram of a peak detecting circuit in the wheel speed representing value derivation circuit of FIG. 1.

FIG. 6 shows detailed construction of the peak detector circuit 44a in the controller circuit section 18a set forth above. As will be seen from FIG. 6, the peak hold circuit 44a generally comprises a peak hold circuit 49a and an switch 49b. The peak hold circuit 49a consists of buffer amplifiers 45 and 46, a diode 47 and a capacitor 48. The buffer amplifier 45 of the peak hold circuit 49a is connected to the wheel acceleration derivation circuit 32a' to receive therefrom the wheel acceleration indicative signal having a value representative of the wheel acceleration $\alpha w_1'$, at a non-inverting input terminal. An inverting input terminal of the buffer amplifier 45 is connected to the output terminal thereof for receiving the amplifier output as feedback input. The buffer amplifier 46 outputs through its output terminal the amplifier output indicative of one of the inputs greater than the other. The amplifier output of the buffer amplifier 45 is fed to a charge/discharge circuit consisting of the diode 47 and the capacitor 48 and to a non-inverting input terminal of the other buffer amplifier 46. Similarly to the aforementioned buffer amplifier 45, an inverting input terminal of the buffer amplifier 46 is connected to the output terminal thereof to receive the amplifier output as feedback input.

Figure 7:
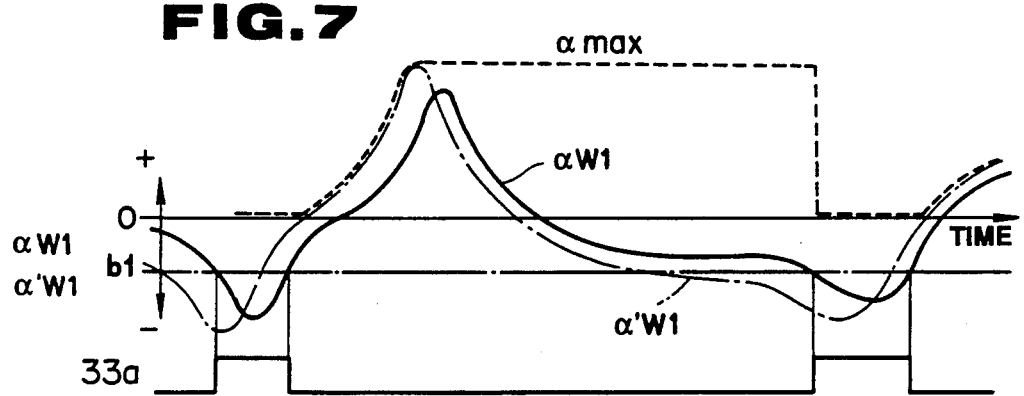
FIG. 7 is a chart showing manner of detection of the wheel speed peak to be carried out by the peak detecting circuit of FIG. 6.

One side of capacitor 48 is connected to ground through the analog switch 49b. The analog switch 49b is connected to the comparator 35a. Therefore, the analog switch 49b becomes conductive at every leading edge of the HIGH level comparator signal from the comparator 35a for connecting the capacitor 48 to the ground. As a result, the potential in the capacitor 48 is discharged to ground. Since the analog switch 49b is held conductive while the comparator signal from the comparator 35a is held at HIGH level, the potential in the capacitor 48 is maintained at substantially zero during this period. The analog switch 49b becomes non-conductive in response to the trailing edge of the HIGH level comparator signal from the comparator 35a to block communication between the capacitor and ground. As a result, the capacitor 48 becomes charged by the amplifier output from the buffer amplifier 45. The potential in capacitor 48 is increased as the wheel acceleration $Ew_1$ increases and is held at the value corresponding to the peak value of the wheel acceleration, as shown in FIG. 7. Therefore, the amplifier output from the buffer amplifier 46 indicates peak value $\alpha w_{max}$ of the wheel acceleration. As set forth above, since the potential in capacitor 48 is discharged every time the comparator signal rises to HIGH, the peak value $\alpha w_{max}$ output from the peak detector circuit 44a represents the peak value of the wheel acceleration $\alpha w_1$ in each skid cycle, while the anti-skid brake control is performed.

Figure 8:
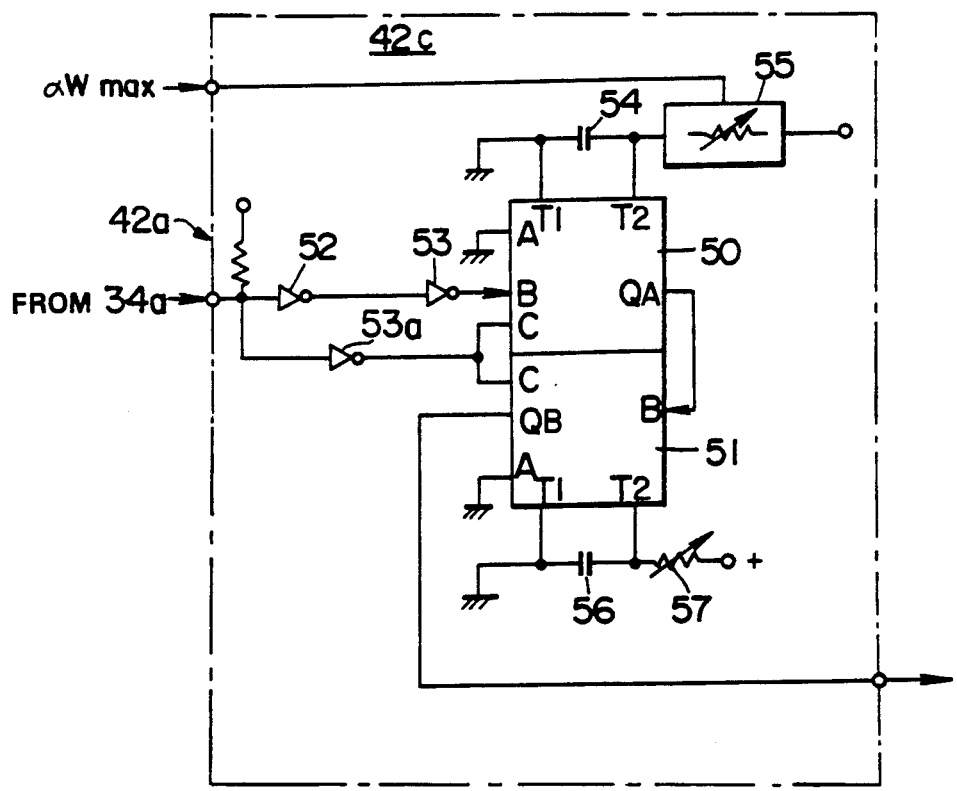
FIG. 8 is a circuit diagram of a variable timer circuit employed in the wheel slip control system of FIG. 1.

FIG. 8 shows a detailed construction of the variable timer 42a. The variable timer 42a generally comprises a first timer 50 and a second timer 51. The first timer 50 has an input port B connected to the output terminal of the comparator 34a through inverter 52 and inverter 53 to receive therefrom the delayed comparator signal. A HIGH level at the input of inverter 53a clears timers 50 and 51 via the timers' C inputs. The first timer 50 is designed to be triggered in response to the trailing edge of the HIGH level input at the input port B to output timer signal $Q_A$ for a given period of time $T_1$. The period $T_1$ to maintain the timer signal $Q_A$ is determined by a time constant derived from the capacitance of a capacitor 54 and a resistance of a variable resistor 55 connected to the terminals $T_1$ and $T_2$ of the first timer 50. The variable resistor 55 is connected to the aforementioned peak detector circuit 44a to receive therefrom the amplifier output as a wheel acceleration peak indicative input. The resistance of the variable resistor 55 is adjusted depending upon the peak value $\alpha w_{max}$ as indicated in the wheel acceleration peak indicative signal. Therefore, the timer period of the first timer 50 is variable in proportion to the magnitude of the peak value $\alpha w_{max}$.

Figure 9:
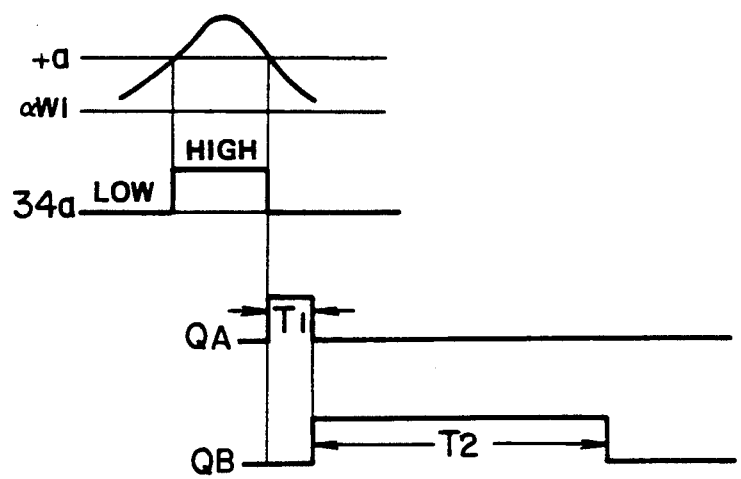
FIG. 9 is a chart showing operation of the variable timer circuit of FIG. 4.

The timer signal $Q_A$ of the first timer 50 is fed to a B input port of the second timer 51. The second timer 51 has a time constant circuit consisting of a capacitor 56 and a variable resistor 57 for providing a timer period $T_2$. The time constant of the circuit of capacitor 56 and variable resistor 57 is set constant so as to set the timer period $T_2$ constant. Therefore, the second timer 51 is triggered by the trailing edge of the HIGH level input at the B input terminal. The second timer 51 as triggered outputs HIGH level timer signal for the period determined by the time constant of the circuit of capacitor 56 and variable resistor 57, through $Q_B$ output terminal for the given period of time $T_2$, as shown in FIG. 9.

Figure 10:
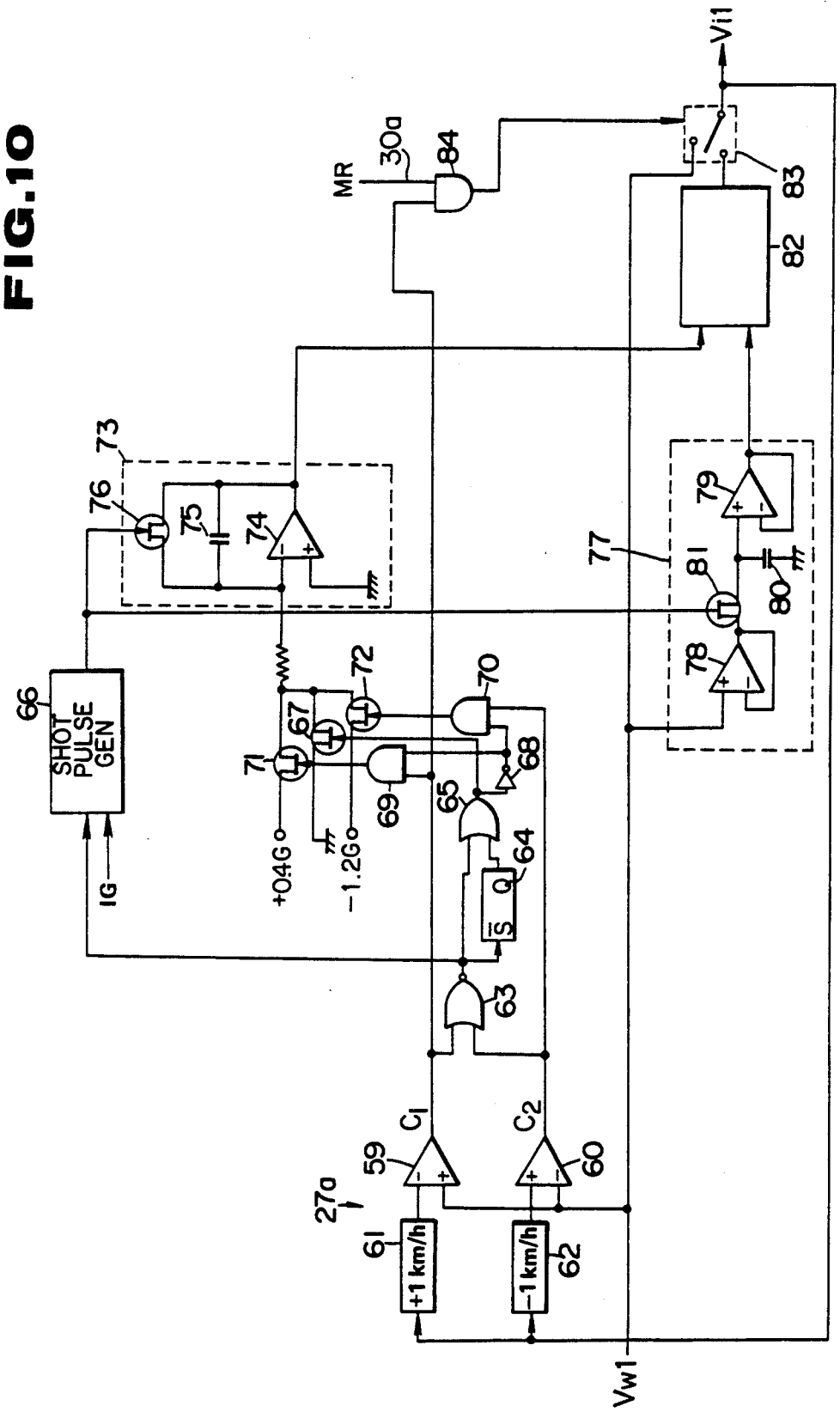
FIG. 10 is a block diagram of a wheel speed drop rate detecting circuit in the preferred embodiment of the anti-skid brake control system of FIG. 1.

FIG. 10 shows the detailed construction of the vehicle speed representing value derivation circuit 27a. As set forth above, the vehicle speed representing value derivation circuit 27a derives a vehicle speed representing value $Vi_1$ based on the wheel speed $Vw_1$ as indicated in the wheel speed signal from the wheel speed derivation circuit 31a. The vehicle speed representing value derivation circuit 27a includes comparators 59 and 60. The comparator 59 has a non-inverting input terminal connected to the wheel speed derivation circuit 31a. On the other hand, the comparator 60 is connected to the wheel speed derivation circuit 31a at an inverting input terminal. An inverting input terminal of the comparator 59 is connected to output terminal of the vehicle speed representing value derivation circuit 27a through which the vehicle speed representing value $Vi_1$ is output, through an adder 61. On the other hand, the non-inverting input terminal of the comparator 60 is connected to the output terminal of the vehicle speed representing value derivation circuit 27a through a subtractor 62. The adder 61 is designed to add a given value corresponding to 1 km/h of vehicle speed to the vehicle speed representing value $Vi_1$ for providing dead band of +1 km/h. The value as the sum of the vehicle speed representing value $Vi_1$ and the dead band value 1 km/h will be hereafter referred to as higher vehicle speed reference value. Similarly, the subtractor 62 subtracts a given value corresponding to 1 km/h of the vehicle speed from the vehicle speed representing value $Vi_1$ for providing dead band of −1 km/h. The value as the difference of the vehicle speed representing value $Vi_1$ and the dead band value −1 km/h will be hereafter referred to as lower vehicle speed reference value. The comparator 59 outputs HIGH level comparator signal when the wheel speed $vw_1$ is higher than or equal to the higher vehicle speed reference value ($vi_1+1$ km/h). In other words, the comparator signal level of the comparator 59 is held LOW as long as the wheel speed $Vw_1$ is maintained lower than the lower vehicle speed reference value ($vi_1+1$ km/h). The comparator 60 outputs HIGH level comparator signal when the wheel speed $vw_1$ is lower than to the lower vehicle speed reference value ($vi_1-1$ km/h). In other words, the comparator 59 signal level of the comparator 59 is held LOW as long as the wheel speed $Vw_1$ is maintained higher than or equal to the lower vehicle speed reference value ($Vi_1-1$ km/h).

The output terminals of the comparators 59 and 60 are connected to input terminals of NOR gate 63 to feed the comparator signals $c_1$ and $c_2$ thereto. The NOR gate 63 outputs HIGH level gate signal while signal levels of both of the comparator signals $c_1$ and $c_2$ are maintained LOW. Namely, the gate signal output from the NOR gate 63 is held LOW while the wheel speed $Vw_1$ is maintained higher than or equal to the vehicle speed representing value $Vi_1-1$ km/h and lower than the higher vehicle speed reference value ($Vi_1+1$ km/h). The gate signal of the NOR gate 63 is fed to a timer 64, an OR gate 65 and a shot-pulse generator 66, respectively. The timer 64 is responsive to the trailing edge of the HIGH level NOR gate signal to output a timer signal for a given period of time $T_3$, e.g. 0.1 sec. The timer signal is fed to the OR gate 65.

The OR gate 65 thus receives the NOR gate signal at one input terminal and the timer signal from the timer 64 at the other input terminal. An OR gate signal of the OR gate 65 is transmitted to a gate of an anal-g switch 67 as a selector signal $S_3$ The output terminal of the OR gate 65 is also connected to one input terminal of AND gates 69 and 70 via an inverter 68. The other input terminal of the AND gate 69 is connected to the output terminal of the comparator 59 to receive therefrom the comparator signal $c_1$ Similarly, the other input terminal of the AND gate 70 is connected to the output terminal of the comparator 60 to receive the comparator signal $c_2$ therefrom. Therefore, the gate signal $S_2$ of the AND gate 69 becomes HIGH while the comparator signal $c_1$ is maintained at HIGH level and the NOR gate signal is held LOW. The gate signal $S_2$ serves as a selector signal. On the other hand, the gate signal $S_4$ of the AND gate 70 becomes HIGH level while the comparator signal $c_2$ is maintained HIGH and the NOR gate signal is held LOW. This gate signal $S_4$ also serves as selector signal. The outputs of AND gates 69 and 70 are connected to gates of analog switches 71 and 72.

The analog switch 67 is turned ON in response to HIGH level selector signal $S_3$ to drop the supply voltage to an integrator circuit 73 to zero. On the other hand, the analog switch 71 is turned ON in response to the HIGH level selector signal $S_2$ to supply a voltage E corresponding to a possible maximum wheel acceleration, e.g. 0.4G, to the integrator circuit 73. The analog switch 72 is likewise turned ON in response to the HIGH level selector signal $S_4$ to supply a voltage corresponding to possible minimum wheel acceleration value, e.g. −1.2G, to the integrator circuit 73.

The integrator circuit 73 has a per se well known construction and consists of an amplifier 74, a capacitor 75 and an analog switch 76. The gate of the analog switch 76 is connected to the shot-pulse generator 66 to receive therefrom a shot-pulse which serves as a reset signal $S_1$. The integrator 73 is reset by the HIGH level reset signal $S_1$ and is responsive to the trailing edge of the HIGH level reset signal to reset the integrated value. The integrator circuit 73 integrates the supply voltage E after termination of the HIGH level reset signal $S_1$ to output he integrator signal. The shot-pulse generator 66 is responsive to an ON-set signal IG of an ignition switch to generate a first shot pulse as the first reset signal for resetting the integrator circuit 73. The shot-pulse generator 66 subsequently generates the shot-pulses serving as the reset signal $S_1$ at every leading edge of the HIGH level NOR gate signal. As set forth above, since the NOR gate signal becomes HIGH when the wheel speed $Vw_1$ satisfies $(Vi_1-1 \text{ km/h}) \leqq Vw_1 < (Vi_1+1 \text{ km/h})$, the integrated value of the integrator 73 is reset every occurrence of the wheel speed $Vw_1$ in the aforementioned range. The reset signal $S_1$ of the shot-pulse generator 66 is also supplied to a sample hold circuit 77. The sample hold circuit 77 comprises buffer amplifiers 78 and 79, a capacitor 80 and an analog switch 81. The analog switch 81 is connected to the shot-pulse generator 66 to receive the reset signal $S_1$ at the gate thereof to be turned ON. The sample hold circuit 77 is responsive to turning ON of the analog switch 81 to reset the held wheel speed value. The sample hold circuit 77 in absence of the reset signal $S_1$ from the shot-pulse generator 66, samples and holds the instantaneous wheel speed value $Vw_1$ at the occurrence of the reset signal as a sample value Vs. The sample hold circuit 77 outputs a sample/hold signal having a value indicative of the sample value Vs to an adder 82. The adder receives the sample/hold signal from the sample hold circuit 77 and integrator signal from the integrator 73. As will be appreciated, the integrator signal has a value indicative of an integrated value $$Ve\left(=\int_0^t (-E) \cdot dt\right).$$

Therefore, the adder 82 adds the integrated value Ve to the sample value Vs to derive the vehicle speed representing value $Vi_1$. The output terminal of the adder 82 is connected to a switching circuit 83. The switching circuit 83 is also directly connected to the wheel speed derivation circuit 31a to input the wheel speed signal. On the other hand, the switching circuit 83 is also connected to an AND gate 84. The AND gate 84 has one input terminal connected to a retriggerable timer 30 to receive therefrom the pump drive signal MR 30a. The other input terminal of the AND gate 84 is connected to the output terminal of the comparator 59. The AND gate 84 controls the switch position of the switching circuit 83 to selectively connect the wheel speed derivation circuit 31a or the adder 82 to the output terminal of the vehicle speed representing value derivation circuit 27a.

Namely, the gate signal of the AND gate is normally maintained LOW level due to absence of the HIGH level pump drive signal MR. The gate signal of the AND gate is also held LOW level while the wheel acceleration is negative or that the wheel speed $Vw_1$ is lower than the $Vi_1 + 1$ km/h value as compared in the comparator 59. While the gate signal is held LOW, the switching circuit 82 is held at a first switch position where the adder 82 is connected to the output terminal of the vehicle speed representing value derivation circuit therethrough. On the other hand, when the HIGH level pump drive signal MR 30a and the HIGH level comparator signal of the comparator 59 are both input to the AND gate, the gate signal of the AND gate 84 turns HIGH to switch the switching circuit 83 to a second switch position where the wheel speed derivation circuit 31a is directly connected to the output terminal of the vehicle speed representing value derivation circuit 27a.

The select-HIGH switch 58 is connected to one terminal of a select-HIGH switch 87 which has a switching element connected to the target wheel speed derivation circuit 28a. The select-HIGH switch 87 is also connected to a vehicle speed representative value correction circuit 86 which modifies the vehicle speed representative value to output a modified vehicle speed representative value Vr.

Figure 11:
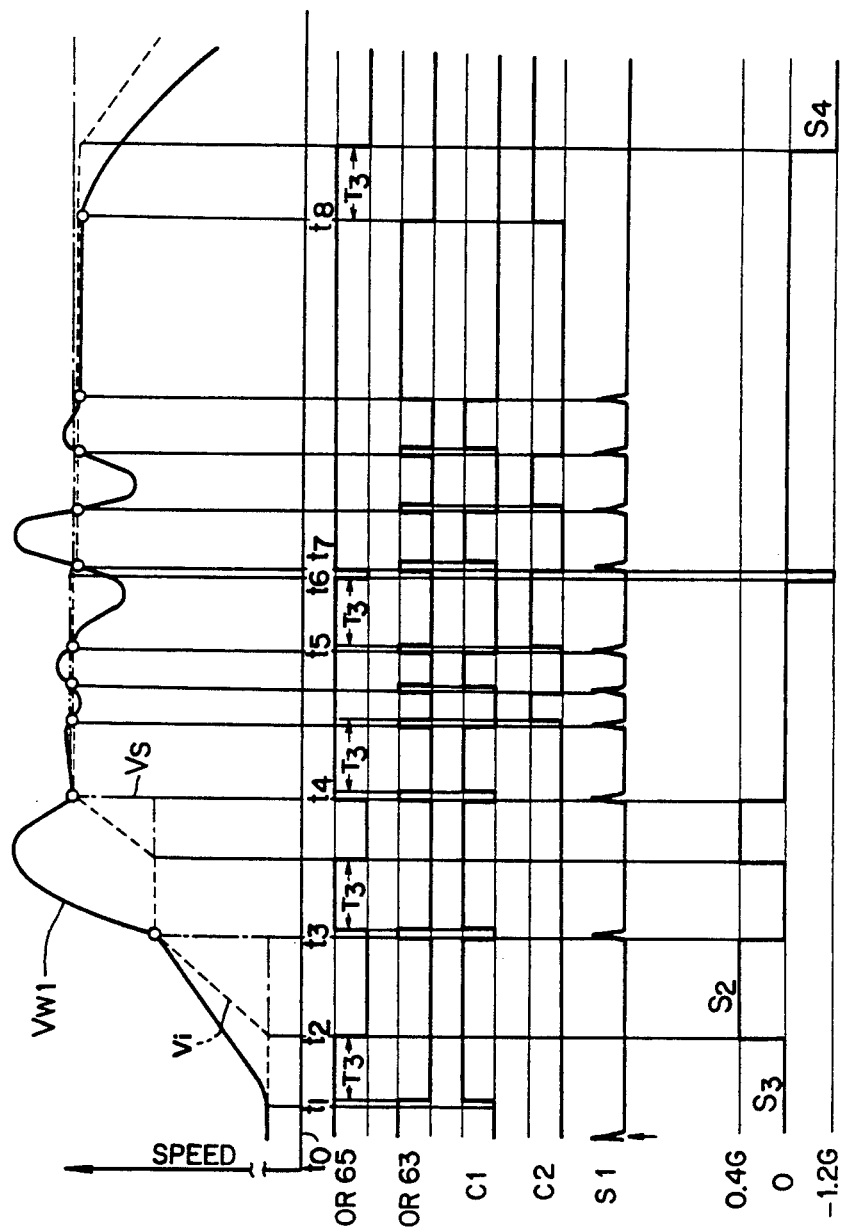
FIG. 11 is a timing chart showing operation of the wheel speed drop rate detecting circuit of FIG. 10.

Operation of the vehicle speed representing derivation circuit 27a will be described herebelow with reference to FIG. 11. In FIG. 11, the operations of the vehicle speed representing value derivation circuit 27a will be described in a condition where the gate signal level of the AND gate 84 is maintained LOW level due to absence of the HIGH level pump signal MR 30a or the comparator signal $c_1$ from the comparator 59 is held LOW. At this condition, by the LOW level gate signal of the AND gate 84, the switching circuit 83 is switched at a switch position where the adder 82 is connected to the output terminal of the vehicle speed representing value derivation circuit.

In the process of FIG. 11, the engine is started up at a time $t_0$. In response thereto, the ON-set signal IG is input to the shot-pulse generator 66. Therefore, the shot pulse $s_1$ is output at the time $t_0$ from the shot-pulse generator 66. With the shot pulse at the time $t_0$, the sample hold circuit 77 is reset. The sample/hold circuit 77 as reset by the shot pulse $s_1$ at the time $t_0$, samples and holds the wheel speed signal value $Vw_1$ as sample value Vs. Therefore, after the time $t_0$, the held sample value Vs is output from the sample hold circuit 77 as an initial vehicle speed representing value. At the same time, i.e. at the time $t_0$, the integrator circuit 73 is reset by the reset signal $s_1$. Therefore, the value Ve of the integrator signal of the integrator circuit 73 drops to zero. As a result, the output value $Vi_1$ from the adder 82 becomes that equal to the held initial vehicle speed representing value Vi, as shown by broken line in FIG. 11.

At this time, the comparator signals $c_1$ and $c_2$ of the comparators 59 and 60 are maintained LOW level. Therefore, the NOR gate signal of the NOR gate 63 is maintained HIGH level. Therefore, the gate signal level of the OR gate 65 is maintained HIGH level and the gate signal is fed to the analog switch 67 as the select signal $S_3$. Therefore, the analog switch 67 is turned ON by the HIGH level gate signal from the OR gate 65. On the other hand, the HIGH level gate signal of the OR gate 65 is fed to the AND gates 69 and 70 through the inverter 68. Therefore, the select signals $S_2$ and $S_4$ of the AND gates 69 and 70 are held LOW to maintain the analog switches 71 and 72 at OFF position. Since the analog switch 67 serves to maintain the input level at the inverting input terminal of the comparator 74 in the integrator circuit 73 at zero, the integrated value of the integrator circuit 73 is maintained at zero. As a consequence, the output value of the adder 82 as the vehicle speed representing value Vi is maintained at the value equal to the initial vehicle speed representing value as the sample value Vs.

After the vehicle starts running, the wheel speed Vw becomes greater than or equal to $Vi_1 + 1$ km/h, at a time $t_1$. In response to this, the comparator signal of the comparator 59 turns to HIGH level. By the HIGH level comparator signal $c_1$ from the comparator 59, the gate signal of the NOR gate 63 turns LOW. At this time, since the timer 64 becomes active to output HIGH level timer signal for a period of time $T_3$, the gate signal level of the OR gate 65 is maintained at HIGH level for the corresponding $T_3$ period. Therefore, the select signal $S_3$ is maintained at HIGH level and the selector signals $S_2$ and $S_4$ are held at LOW level. Therefore, even after the vehicle starts running the vehicle speed representing value $Vi_1$ is held at the equal value to the sample value Vs for the $T_3$ period.

After expiration of the $T_3$ period, at a time $t_2$, the gate signal of the OR gate 65 is turned into LOW level due to termination of the HIGH level timer signal from the timer 64. Since the comparator signal $c_1$ and the inverted gate signal from the OR gate 65 through the inverter 68 both become HIGH level, the selector signal $S_2$ of the AND gate 69 turns HIGH. At the same time, because LOW level gate signal of the OR gate 65 is applied to the gate of the analog switch 67 as the select signal $S_3$ to turn the latter OFF. At this time, since the comparator signal from the comparator 60 is maintained at LOW level, the AND gate 70 is maintained non-conductive to feed the LOW level select signal $S_4$. Therefore, only analog switch 71 is turned ON to input a value corresponding to wheel acceleration magnitude of 0.4G. This value, e.g. 0.4G serves for defining inclination of the vehicle speed representing value $vi_1$. The integrator circuit 73 thus receives the value (0.4G) through the analog switch 71 to output the integrator signal having a value Ve as set forth above. Therefore, the output value of the adder 82 increases from time-to-time as the increasing of the integrator signal value Ve.

At a time $t_3$, the vehicle speed representing value $vi_1 (= Vs + Ve)$ reaches a value to establish $vw_1 < vi_1 + 1$ km/h. Then, the comparator signal $c_1$ turns into LOW level. Therefore, the gate signal level of the NOR gate 63 again turns into HIGH level. The shot-pulse generator 66 is triggered by the leading edge of the HIGH level gate signal of the NOR gate to output the shot pulse serving as the reset pulse $S_1$. Therefore, the sample hold circuit 77 and the integrator circuit 73 are reset.

At the same time, the instantaneous wheel speed $Vw_1$ at the time $t_3$ is sampled and held in the sample hold circuit 77 as the renewed sample value Vs. By renewing the sample value Vs, the vehicle speed representing value $Vi_1$ becomes equal to the instantaneous wheel speed value $Vw_1$ and thus establishes $Vw_1 \geq Vi+1$ km/h. Therefore, the comparator signal $c_1$ again turns ON at the time $t_3$ Similarly to the control behavior at the period from $t_1$ to $t_3$, the gate signal of the OR gate 65 is held HIGH for the $T_3$ period by HIGH level timer signal of the timer 64. Similarly, at the time $t_4$, the shot-pulse generator 66 is triggered to output the reset signal $S_1$ to renew the sample value Vs by the instantaneous wheel speed $Vi_1$ at the time $t_4$. After the time $t_4$, the sampled value vs is maintained constant for the given period $T_3$ by the HIGH level timer signal of the timer 64. Before the HIGH level timer signal terminates, the shot pulse as the reset signal is generated by the shot pulse generator 66, as shown in FIG. 9. While the interval of the shot pulse of the shot pulse generator 66 is shorter than the timer period $T_3$, the integrated value of the integrator 73 is maintained at zero. Therefore, the adder outputs the sampled value Vs as the vehicle speed representing value $Vi_1$.

After a time $t_5$, at which the reset signal $s_1$ is produced for resetting the sample hold circuit 77 and the intergrator 73, the gate signal of the OR gate turns LOW at a time $t_6$ after expiration of the timer period $T_3$. During the period between the times $t_5$ and $t_6$, the wheel speed $Vw_1$ drops to be lower than ($vi_1 - 1$ km/h). Since the wheel speed $Vw_1$ is maintained lower than the value ($Vi_1 - 1$ km/h) at the time $t_6$, the comparator signal $c_1$ of the comparator 59 is maintained LOW and the comparator signal $c_2$ of the comparator 60 is maintained HIGH. Therefore, the analog switch 71 is held OFF and the analog switch 72 is turned ON. Therefore, a value corresponding to a predetermined deceleration magnitude of $-1.2G$ is input through the analog switch 72. Consequently, the integrated value in the integrator 73 becomes negative. The negative integrated value is summed with the sample value Vs which corresponds to the instantaneous wheel speed $Vw_1$ at a time $t_5$ to gradually reduce the value of the vehicle speed representing value $Vi_1$ At a time $t_7$, the wheel speed $Vw_1$ is increased across the value ($vi_1 + 1$ km/h). As a result, the reset signal $s_1$ is generated by the shot pulse generator 66. The sample hold circuit 77 and integrator 73 are thus reset.

At a time $t_8$, braking operation is initiated to abruptly decelerate the vehicle. As a result, the wheel speed $Vw_1$ drops across the value of ($vi_1 - 1$ km/h). By this, the comparator signal $c_2$ of the comparator rises to HIGH level to change the NOR condition at the NOR gate 63. Therefore, the NOR gate signal of the NOR gate turns into a LOW level. The timer 64 is thus triggered by the trailing edge of the HIGH level NOR gate signal to output HIGH level timer signal for the timer period $T_3$. After expiration of the timer period $T_3$, the value corresponding to the deceleration magnitude of $-1.2G$ is input to the integrator. Therefore, the vehicle speed representing value $Vi_1$ is gradually decreased.

Figure 12:
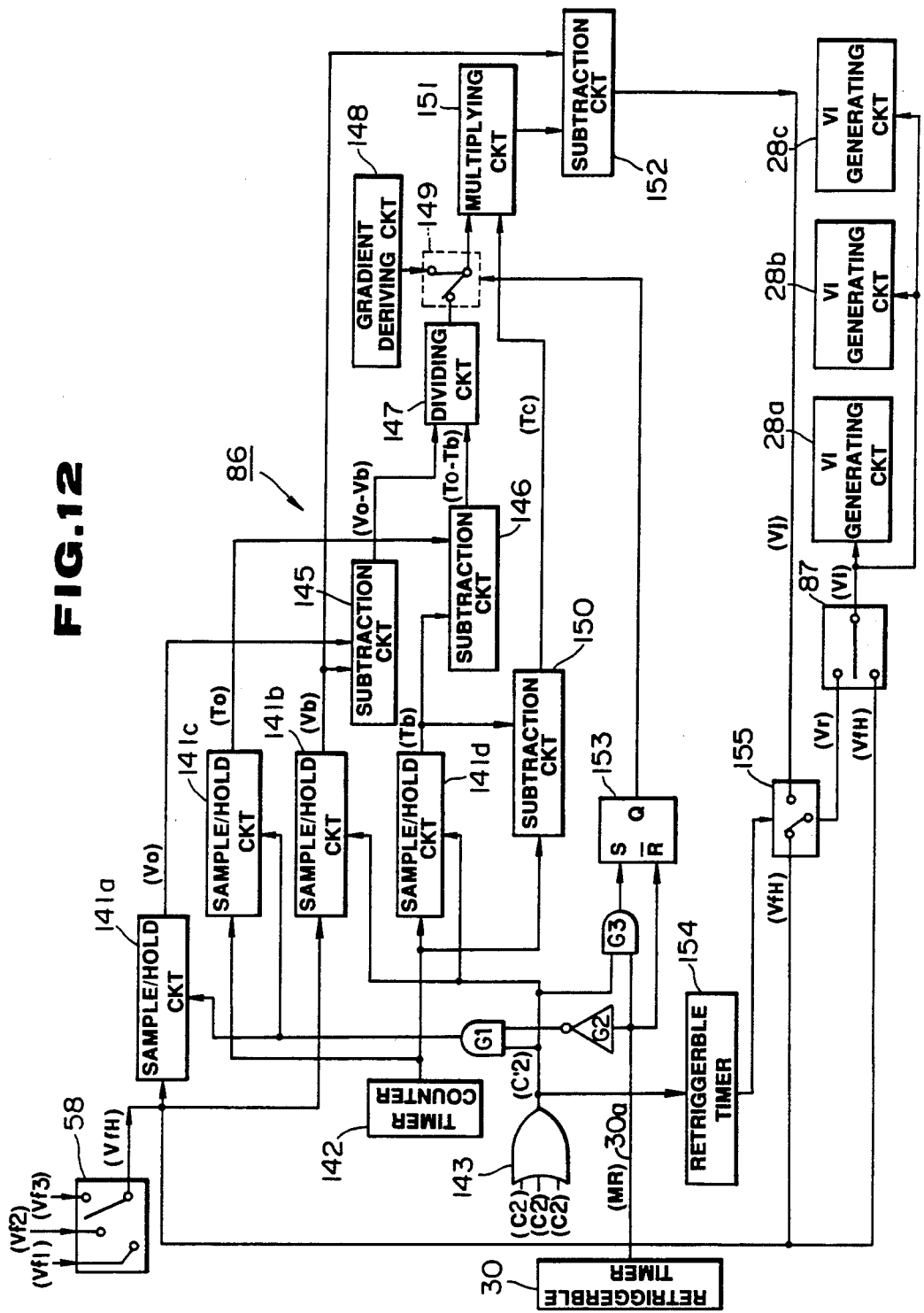
FIG. 12 is a block diagram of the preferred embodiment of the vehicle speed representing value derivation circuit in the wheel slip control system of FIG. 1.

FIG. 12 shows the vehicle speed representative value correction circuit 86. The vehicle speed representative value correction circuit 86 includes sample/hold circuits 141a and 141b to receive the select-HIGH output $V_{fh}$. The vehicle speed representative value correction circuit 86 includes a timer counter 142 which periodically counts up a clock pulse for outputting a counter value. The output of the timer counter 142 is connected to sample/hold circuit 141c and 141d. The sample/hold circuits 141a and 141c are controlled as to sample/hold timing by a timing signal output from an AND gate $G_1$. The AND gate $G_1$ has one input terminal connected to an OR gate 143 which receives comparator signals $c_2$ of comparators 60 of respective vehicle speed representative value derivation circuits 27a, 27b and 27c. The OR gate 143 also controls sample/hold timing of the sample/hold circuits 141b and 141d by its output serving as a timing signal. The OR gate 143 thus outputs a HIGH level timing signal to the sample/hold circuit 141b and 141d for sampling the vehicle speed via the select-HIGH output from the select-HIGH switch 58 whenever one of the comparator outputs $c_2$ of respective vehicle speed representative value derivation circuit 27a, 27b and 27c turns into HIGH level. On the other hand, the other input terminal of the AND gate $G_1$ is connected to the retriggerable timer 30 via an inverter $G_2$ for receiving an inverted MR signal 30a. Therefore, the timing signal of the AND gate $G_1$ turns into HIGH level only when the MR signal 30a of the retriggerable timer 30 is maintained LOW level which means that the operational mode of the anti-skid brake control system is in APPLICATION mode out of the skid cycle, and the output of the OR gate 143 is held at HIGH level. Since the MR signal 30a turns into HIGH level at the initiation of the respective skid cycle, the sample/hold circuits 141a and 141c sample the vehicle speed representative via the select-HIGH output and the corresponding timing data upon initiation of the skid cycle. The sample/hold circuits 141a and 141c maintain the vehicle speed representative via the select-HIGH output and the timer counter value upon initiation of the skid cycle.

The sample/hold circuits 141a and 141b are commonly connected to a subtraction circuit 145 which derives a difference (Va−Vb) between the two vehicle speed representative values. On the other hand and similarly to the foregoing, the sample/hold circuits 141c and 141d are commonly connected to a subtraction circuit 146. The subtraction circuit 146 thus derives a difference ($T_a - T_b$) between the outputs of the sample/hold circuits 141c and 141d. The output of the subtraction circuit 145 thus represents a wheel speed variation magnitude from the initiation of the current skid control cycle. On the other hand, the output of the subtraction circuit 146 represents an interval from the initiation timing of the skid cycle. The outputs of the subtraction circuits 145 and 146 are fed to a divider circuit 147 which divides the output of the subtractor 145 by the timer counter value ($T_o - T_b$). The divider circuit 147 thus derives wheel deceleration gradient data. The wheel deceleration gradient data is fed to a multiplier circuit 151 via a switching circuit 149, which is connected to a gradient data generator circuit 148 designed for outputting a fixed value of gradient data. The gradient data generator circuit 148 is used for the first skid control cycle. Multiplier 151 is connected to subtractor circuit 150. The subtractor circuit 150 receives inputs corresponding to signal values above and below and for deriving an elapsed time from the most recent interval for interpolation.

The multiplier circuit 151 thus derives vehicle deceleration magnitude representative data on the basis of the level of the output of the divider circuit 147 and the elapsed time interval with high precision. Then, the output of multiplier circuit 151 is fed to a subtraction circuit 152 which subtracts the vehicle deceleration magnitude representative data from a sampled vehicle speed representative value in order to derive an instantaneous vehicle speed representative value. The subtraction circuit 152 feeds the instantaneous wheel speed representative data to a switching circuit 155. The other input terminal of the switching circuit 155 is connected to the select-HIGH switch 58 to receive therefrom the vehicle speed representative data. The switching circuit 155 is also connected to the OR gate 143 via a retriggerable timer 154 to receive therefrom a switching signal. The switching circuit 155 connects the select-HIGH switch 58 to a select-HIGH switch 87 as long as the switching signal is maintained at LOW level. When the switching signal turns to the HIGH level, the subtractor 152 is connected to the select high switch 87.

The select-HIGH switch 87 is also connected to the select-HIGH switch 58 to directly receive the vehicle speed representative value $V_{fH}$. The select-HIGH switch 87 compares the inputs from the select-HIGH switch 58 and from the subtractor 152 so that the output of the vehicle speed representative value may precisely correspond to the greater of the vehicle speed representative value of the select-HIGH switch 58 and the data from the subtractor 152.

On the other hand, the vehicle speed representative value correction circuit 86 has a flip-flop 153 which has a reset input terminal connected to the retriggerable timer 30 to receive therefrom the MR signal 30a, and a set input terminal connected to an AND gate $G_3$. The AND gate $G_3$ is connected to the retriggerable timer 30 and the OR gate 143. The output terminal of the flip-flop 153 is connected to the switching circuit 149. The flip-flop 153 outputs a LOW level signal to establish connection between the gradient generator circuit 148 until the anti-skid brake control is initiated. On the other hand, the flip-flop 153 outputs a HIGH level in response to initiation of the anti-skid control by resetting the same in response to HIGH level input at the reset terminal. Therefore, from the second skid control cycle, the switching circuit 149 maintains connection between the divider circuit 147 and the multiplier circuit 151.

In the operation of the vehicle speed representative value correction circuit 86, the OR gate 143 outputs a HIGH level timing signal to the sample/hold circuits 141b and 141d when any one of the comparator signals $c_2$ of the comparators 60 of the vehicle speed representative value derivation circuits 27a, 27b and 27c becomes a HIGH level. Under presence of the HIGH level timing signal $c_2'$ of the OR gate 143, the AND gate $G_1$ is responsive to the HIGH level MR signal 30a of the retriggerable timer 30 to output a HIGH level timing signal to the sample/hold circuits 141a and 141c. The sample/hold circuits 141a and 141c are responsive to the leading edge of the HIGH level timing signal to sample the instantaneous values of the vehicle speed representative select-HIGH value $V_{fH}$ from the select-HIGH switch 58 and the timer counter value $T_b$. Since the MR signal 30a of the retriggerable timer 30 is maintained at HIGH level throughout the period in which anti-skid brake control is continued, the held values in the sample/hold circuits 141a and 141c may be maintained throughout the anti-skid brake control. On the other hand, the held values of the sample/hold circuits 141b and 141d are updated on every occurrence of the HIGH level comparator signal $c_2$.

On the other hand, the flip-flop 153 is initially reset by the HIGH level MR signal 30a to turn the switching signal into a LOW level. The flip-flop 153 is maintained in reset state until the first occurrence of the HIGH level timing signal $c_2'$ of the OR gate 143. Therefore, the switching circuit 149 is switched to the initial position to establish connection between the gradient generator circuit 148 and the multiplier circuit 151. Therefore, wheel deceleration magnitude indicative value is thus derived by utilizing the fixed gradient value $A_0$ generated by the gradient generator circuit 148. On the other hand, in subsequent skid control cycles, flip-flop 153 is set by the first occurrence of the HIGH level timing signal of the OR gate 143, the switch position of the switching circuit 149 is switched into a state for establishing connection between the divider circuit 147 and the multiplier circuit 151. Therefore, the gradient data derived by the divider circuit 147 is utilized for deriving the wheel deceleration magnitude indicative data.

Until the first HIGH level timing signal $c_2'$ occurs, the retriggerable timer 154 is held inoperative. Therefore, switching circuit 155 is maintained in a switch position where the select-HIGH switch 58 is connected to the select-HIGH switch 87. Therefore, the vehicle speed representative select-HIGH output $V_{fH}$ is output as the vehicle speed representative value Vi. On the other hand, when the retriggerable timer 154 is triggered by the HIGH level timing signal $c_2'$, the switching circuit 155 is switched to establish connection between the subtraction circuit 152 and the select-HIGH switch 87. Therefore, through the select-HIGH switch 87 the greater one of the vehicle speed representative value from the select-HIGH switch 58 and the output of the subtraction circuit 152 is output as the vehicle speed representative value Vi.

Figure 13:
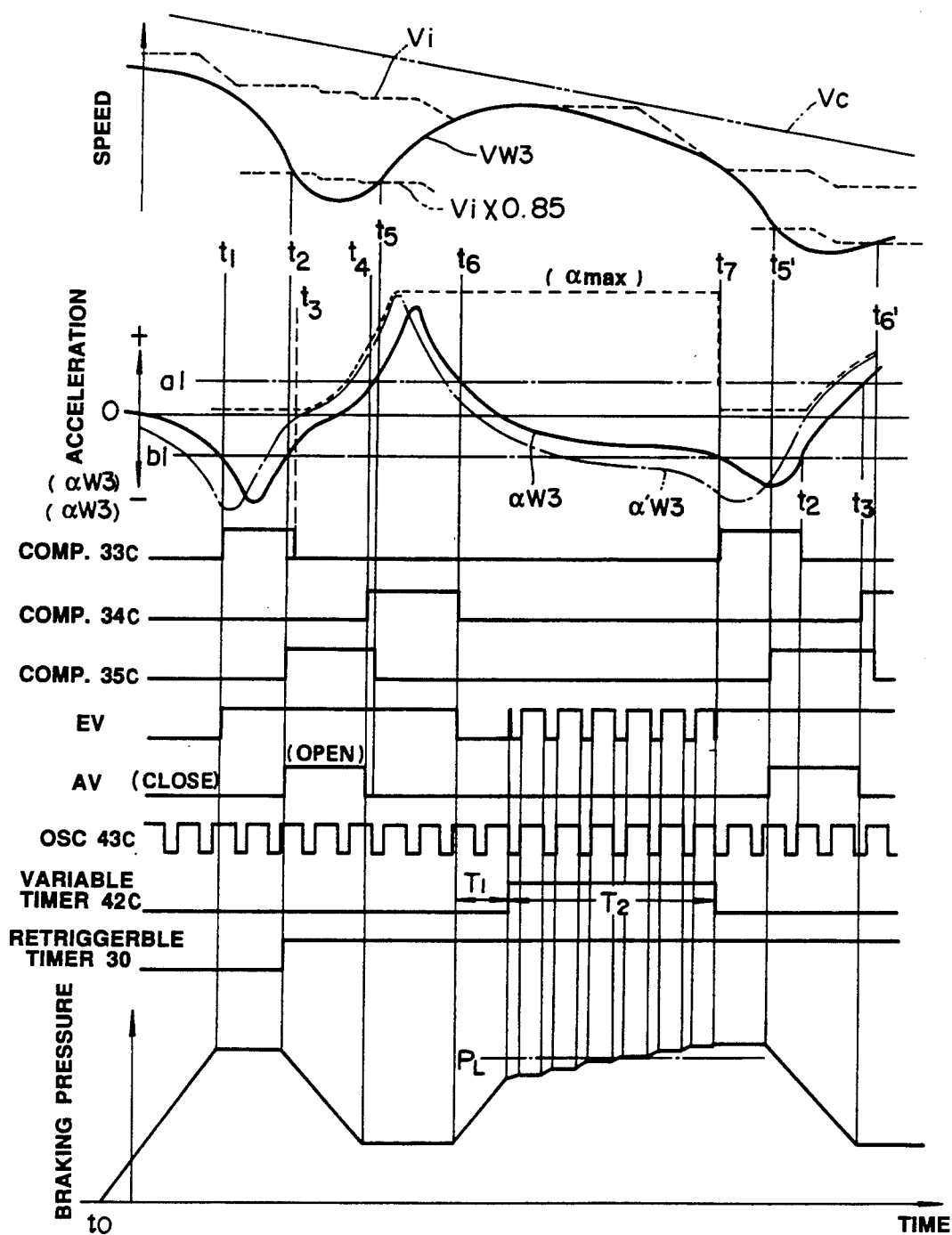
FIG. 13 is a timing chart showing operation of the anti-skid brake control to be performed by the wheel slip control system of FIG. 1 for controlling braking pressure for rear wheels.

FIG. 13 shows a timing chart of the operation of the controller circuit section 18a in anti-skid brake control for the rear wheels.

It is assumed that vehicular brake is applied for deceleration of the vehicle at a time $t_0$, hydraulic braking pressure is built up and distributed to all of the wheel cylinders 1a, 2a, 3a and 4a in common. By increasing the braking pressure in the wheel cylinders 3a and 4a, the rear wheels 3 and 4 are decelerated.

At a time $t_1$, the wheel acceleration $\alpha w_3$ decreases across the wheel deceleration threshold $-b$. This results in initiation of anti-skid brake control. Namely, since the wheel acceleration $\alpha w_3$ becomes smaller than the wheel deceleration threshold $-b$, the comparator signal of the comparator 33c turns into HIGH level. This turns the gate signals of the OR gates 36c and 40c into HIGH level. Therefore, the inlet control signal $EV_3$ output through the amplifier 37c turns to a HIGH level. Therefore, valve 19c is shut at time $t_1$. At this time, since the output of the AND gate 38c is held LOW level, the outlet control signal $AV_3$ is held LOW. Therefore, AV valve 20c is also maintained in a closed position. Therefore, the anti-skid brake control valve assembly 7c is placed in HOLD mode position. The braking pressure in the wheel cylinders 3a and 4a is thus held constant at the pressure level at the time $t_1$.

For the initial cycle of the anti-skid brake control, the vehicle speed representing value Vi is derived by the vehicle speed representing value derivation system 27a, 27b and 27c. The greatest one of the vehicle speed representative values $V_{f1}$, $V_{f2}$ and $V_{f3}$ is selected by the select-HIGH switch 58. The vehicle speed representative select-HIGH output $V_{fH}$ is fed to the select-HIGH switch 87 and the vehicle speed representative value correction circuit 86. The select-HIGH switch 87 selects greater one of the vehicle speed representative select-HIGH output $V_{fH}$ of the select-HIGH switch 58 and the modified vehicle speed representative value $V_r$ of the vehicle speed representative value correction circuit 86 as the common vehicle speed representative value Vi. Based on the common vehicle speed representing value Vi, the target wheel speed $V\lambda_3$ is derived at a value 85% of Vi. As described above, since the vehicle speed representing value decreases according to the integrated value of the integrator 73, the target wheel speed $V\lambda_3$ decreases continuously. At a time $t_2$, the lower rear wheel speed $Vw_R$ is decelerated across the target wheel speed $V\lambda_3$. Then, the comparator signal of the comparator 35c turns into a HIGH level. At this time, since the comparator signal of the comparator 34c is held LOW to apply HIGH level input to the AND gate 38c through the inverting input terminal, an AND condition is established at the AND gate 38c. Therefore, the output of the AND gate 38c turns into HIGH level as the HIGH level outlet control signal $AV_3$. This operates the anti-skid brake control valve assembly 17c into the RELEASE mode position. Therefore, the braking pressure in the wheel cylinders 3a and 4a is released by feeding back the pressurized braking fluid to the pressure accumulator 22c. At the same time, the HIGH level outlet control signal $AV_3$, triggers the retriggerable timer 30 to start outputting the pump drive signal MR309. Therefore, the pump motor 24 starts driving the fluid pump 21c.

By decreasing the braking pressure in the wheel cylinders 3a and 4a, the wheel speed $Vw_3$ is resumed and therefore wheel acceleration $\lambda w_3$ is increased. The wheel acceleration $\lambda w_3$ increases across the wheel deceleration threshold $-b$ at a time $t_3$. Therefore, the comparator signal of the comparator 33c turns into LOW level at the time $t_3$. However, at this time, since the HIGH level comparator signal is input to the OR gate 36c, the output of gate 36c is maintained at a HIGH level. Therefore, the output of the OR gate 40c is held HIGH to maintain the inlet control signal $EV_3$ at HIGH level. Therefore, the anti-skid control valve assembly 17c is maintained in the RELEASE mode, at the time $t_3$. Thus the wheel speeds $Vw_3$ continue to increase. Accordingly, the wheel acceleration $\alpha w_3$ increases. At a time $t_4$, the wheel acceleration $\alpha w_3$ increases across the wheel acceleration threshold $+a$. This results in HIGH level comparator signal of the comparator 34c. This HIGH level comparator signal of the comparator 34c forces the output of the AND gate 38c in a LOW level. Therefore, the outlet control signal $AV_3$ turns into LOW level to close AV valve 20c and 20d in the anti-skid brake control valve assembly 17c 17d. As a result, the anti-skid brake control valve assembly 17c is again placed into the HOLD mode to maintain the braking pressure level constant at the pressure level at the time $t_4$. By holding the braking pressure at a decreased level, the wheel speed $Vw_3$ still increases. Also, by increasing the wheel speed, wheel acceleration $\alpha w_3$ increases toward the peak $\alpha w_{max}$. As seen from FIG. 10, the rear wheel speed $Vw_3$ increases across the target wheel speed $V\lambda_3$ at a time $t_5$. This results in LOW level comparator signal of the comparator 35c. After this, at a time $t_6$, the wheel acceleration $\alpha w_3$ drops across the wheel acceleration threshold $+a$. In response to the wheel acceleration $\alpha w_3$ dropping across the wheel acceleration threshold $+a$, the comparator signal of the comparator 34c turns into LOW level. Therefore, the all of the inputs to the gate 36c becomes Low level. Therefore, the OR output signal of the OR gate 36c turns into LOW level to cause LOW level inlet control signal $EV_3$ at the time $t_6$. At the same time, the variable timer 42c is activated by the trailing edge of the HIGH level comparator signal of the comparator 34c to output HIGH level timer signal for a period $T_2$ after a delay time $T_1$ which is variable depending upon the wheel acceleration peak value as latched by the peak hold circuit 44c. During the period $T_2$, the oscillator 43c is triggered to output constant pulse signals. As will be appreciated, while the pulse signal is maintained ON (HIGH) level, AND conditions are established in the AND gate 41c to maintain the inlet control signal $EV_3$ at HIGH level. Therefore, during the delay time $T_1$, the anti-skid brake control valves 17c is held in APPLICATION mode to increase the braking pressure. On the other hand, during the period $T_2$, the operation mode of the anti-skid brake control valve 17c and 17d are alternated between APPLICATION mode and HOLD mode repeatedly.

At a time $t_7$, the wheel acceleration $\alpha w_3$ drops across the wheel deceleration threshold $-b$. Therefore, another cycle of anti-skid brake control is initiated. At the same time, the peak hold circuit 44c is reset by the leading edge of the HIGH level comparator signal of the comparator 33c. Thereafter, one skid cycle of anti-skid brake control operation is performed during the period $t_7$ to $t_{12}$.

As will be appreciated herefrom, the anti-skid brake control to be taken place for releasing the braking pressure in both of the rear wheel cylinders in response to decreasing of the lower rear wheel speed $Vw_R$ across the target wheel speed $V\lambda_3$ in synchronism with each other and at the same rate. On the other hand, in the APPLICATION mode, the braking pressures in the rear wheel cylinders are built up at different rate to each other. As a result, when one of the wheel is decelerated across the target wheel speed, the other wheel is rotating at higher speed than the target wheel speed. Therefore, it is successfully avoided to cause locking of both wheels at the same time. This assures derivation of the vehicle speed representing value $Vi_3$ at the value precisely reflecting the vehicle speed to allow precise control for the brake.

After the time $t_{15}$, the wheel acceleration $\alpha w_1$ reaches the peak. The peak value is held by the peak hold circuits 44a and 44b. Therefore, the input level at the inverting input terminals of the comparators 93a and 93b are increased to $\frac{3}{4}$ of the held peak value $\alpha w_{max}$.

As seen from FIG. 13, the peak value $\alpha w_{max}$ as held in the peak hold circuits 44a and 44b are different from each other. Namely, in the shown example, the peak value $\alpha w_{max}$ held in the peak hold circuit 44a is smaller than that of the peak hold circuit 44b.

At a time $t_{16}$, the wheel acceleration $\alpha w_1$ decreases across the wheel acceleration threshold $+a$. As a result, the anti-skid brake control valves 17a and 17b are operated into APPLICATION mode to increase the braking pressure in the wheel cylinders 1a and 2a in stepwise fashion by alternating the anti-skid brake control valve positions between APPLICATION mode position and HOLD mode position. During this period, the LOW level OR gates signals of the OR gates 40a and 40b are applied to the input terminal of the counters 94a and 94b. Therefore, the counters 94a and 94b integrate a predetermined unit value to produce counter signals. The counter values of the counters 94a and 94b are compared with the ¾ of the peak values $aw_{max}$ in the comparators 93a and 93b. The counter values of the counters 94a and 94b reaches the $\frac{3}{4} \times aw_{max}$ values at a time $t_{16}$. Therefore, the comparator signals of the comparators 93a and 93b turns into HIGH level.

While the difference of the counter values of the counters 94a and 94b as derived by the subtractor 100 is held smaller than a given value, the comparator 101 maintains HIGH level comparator signal. Therefore, the gate signal of the AND gates 99a and 99b turns into HIGH level. At the time $t_{16}$, the inputs for the AND gate 92a from the inverters 97 and 98a are held HIGH level and the input for the AND gate 92b from the inverter 98b is held HIGH level. However, since the inverted input from the inverter 97 turns LOW level, the AND gate 92a is held the gate signal level at LOW level. Therefore, only timer 91b is triggered to output the HIGH level timer signal for the given period of time ΔT. The HIGH level timer signal is fed to the input terminal of the OR gate 90b to maintain the gate signal of the OR gate 90b at HIGH level. As a result, the inlet control signal $EV_2$ for the anti-skid brake control valve 17b is maintained HIGH level.

On the other hand, since the gate signal of the AND gate 92a is maintained at LOW level as set forth above, the timer signal of the timer 91a is maintained LOW level to allow altering of the gate signal of the AND gate 41a between HIGH and LOW levels to alternate the inlet control signal between HIGH and LOW levels to increase the braking pressure in the wheel cylinder 1a in stepwise fashion.

Therefore, after the time $t_{16a}$, the braking pressure in the wheel cylinder 1 is continued to increase and the braking pressure in the wheel cylinder 2 is maintained at constant level for the period ΔT.

As will be seen from FIG. 13, by continuing increasing of the braking pressure, the wheel speed $Vw_1$ is decreased and the wheel acceleration $aw_1$ drops across the wheel deceleration threshold −b to turn the comparator signal of the comparator 33a into HIGH level, at a time $t_{16b}$. Subsequently, the wheel speed $Vw_1$ decreases across the target wheel speed $V\lambda_1$ to turn the comparator signal of the comparator 35a into HIGH level. As a result, the counter 94a is reset by the leading edge of the HIGH level comparator signal from the comparator 35a.

After the given period ΔT and at a time $t_{16c}$, the timer signal of the timer 91b turns LOW level to allow alternating the gate signal level of the OR gate 90b between HIGH and LOW levels. Therefore, the fluid pressure in the wheel cylinder 2a increases in stepwise fashion.

In the shown example, the counter value of the counter 94a again reaches the $\frac{3}{4} \times aw_{max}$ at a time $t_{16d}$. However, at this time, since the difference of the counter values of the counters 94a and 94b are held greater than the given value, the comparator signal of the comparator 101 is maintained LOW level. Therefore, the timers 91a and 91b are not triggered.

Therefore, simultaneous locking of the front wheels can be successfully avoided.

While the present invention has been disclosed in detail in terms of the preferred embodiment which implements the best mode of the invention, the present invention should not be limited to the specific embodiment set forth above. Namely, the various components constituting the anti-skid brake control system can be replaced with other components or other constructions of components which can implement the equivalent operations. Furthermore, the whole system which can perform the equivalent operation to that set forth above may also be included in the scope of the invention.

Figure 14:
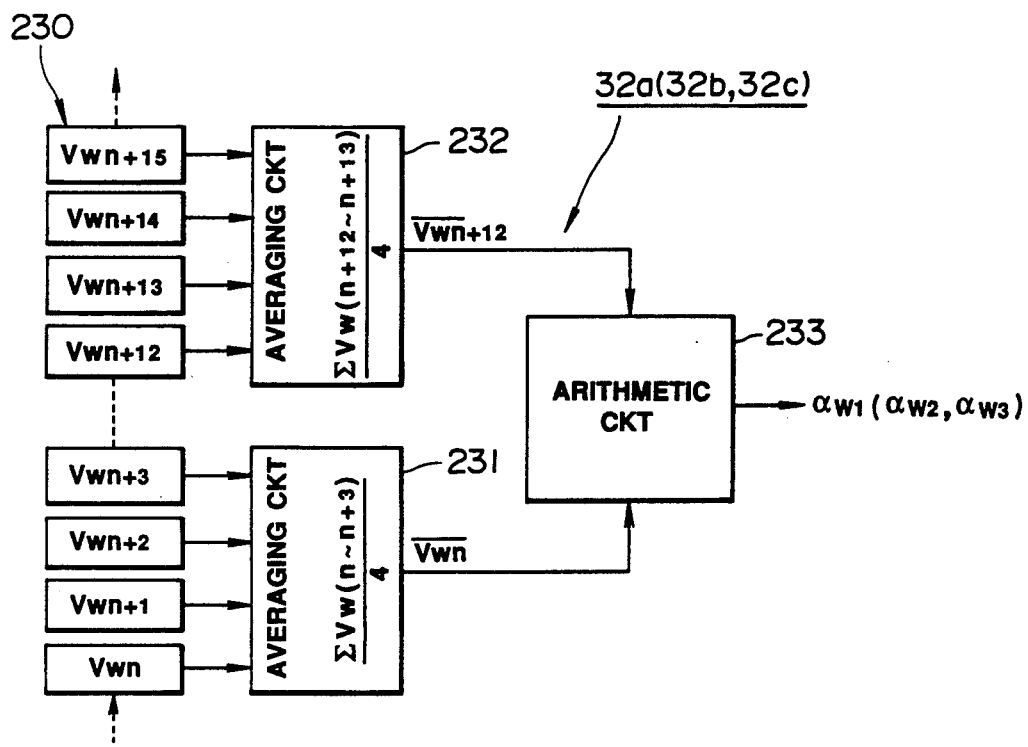
FIGS. 14 and 15 are block diagrams of other embodiments of wheel acceleration derivation circuits to be employed in the shown embodiment of the anti-skid brake control system of FIG. 1.
Figure 15:
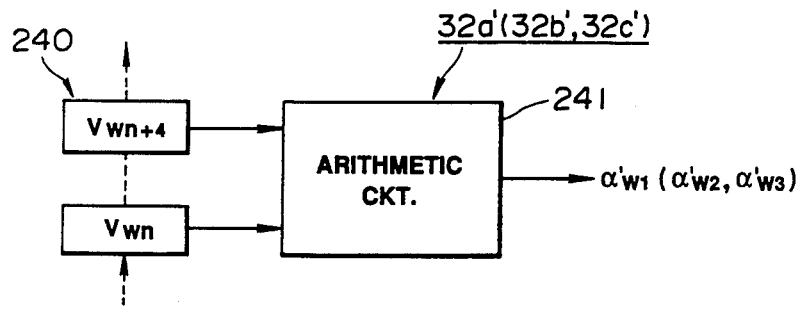

FIGS. 14 and 15 show a modification of the wheel acceleration derivation circuit which can be employed in the shown embodiment of the anti-skid brake control system according to the present invention. In the modification of FIG. 14, a wheel acceleration derivation circuit is designed as a replacement for the wheel acceleration derivation circuit 32a. The shown wheel acceleration derivation circuit comprises a shift register 230 for storing vehicle speed data Vw in a plurality of memory blocks. Averaging circuits 231 and 232 are provided for obtaining running average value of a predetermined number of wheel speed data. In the shown embodiment, the averaging circuit 231 is adapted to derive the average value $\overline{Vw_n}$ of the wheel speed data $Vw_n$, $Vw_{n+1}$, $Vw_{n+2}$ and $Vw_{n+3}$ respectively obtained at four recent derivation cycles of the wheel speed data. On the other hand, the averaging circuit 232 derives an average value $\overline{Vw_{n+12}}$ of the wheel speed data $Vw_{n+12}$, $Vw_{n+13}$, $Vw_{n+14}$ and $Vw_{n+15}$ obtained over twelve to fifteen cycles ahead. The averaging circuits 231 and 232 feed the average values $\overline{Vw_n}$ and $\overline{Vw_{n+12}}$ to an arithmetic circuit 233. The arithmetic circuit 233 derives the difference of the input average values $\overline{Vw_n}$ and $\overline{Vw_{n+12}}$ and divides the obtained difference by the known period. In the shown example, the interval of deriving the wheel speed data $Vw_n$ is set at 5 msec. Therefore, the period between the derivation timing of the wheel speed data $Vw_{n+12}$ to the derivation timing of the instantaneous wheel speed data $Vw_n$ becomes 60 msec. The arithmetic circuit 233 thus output the wheel acceleration indicative signal $aw$. On the other hand, the wheel acceleration derivation circuit 32a' is provided a shift register 240 and an arithmetic circuit 241 as shown in FIG. 15. The arithmetic circuit 241 reads out the wheel speed data $Vw_n$ in the instant cycle and $Vw_{n+4}$ in the fourth preceding cycle to calculate the difference therebetween. The arithmetic circuit 241 is further operative for dividing the obtained difference with a known period, (4 cycles × 5 msec) = 20 msec. By this, the wheel acceleration derivation circuit 32a' outputs the wheel acceleration indicative signal $aw'$.

Figure 16:
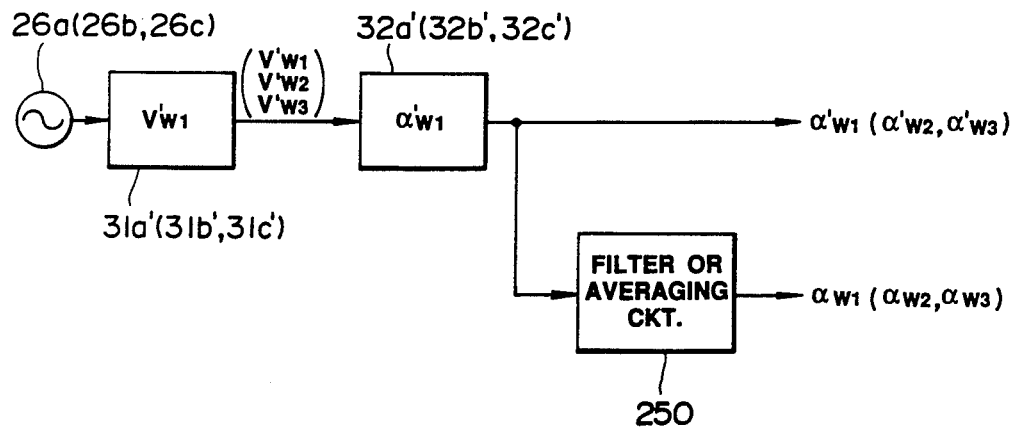
FIG. 16 is a block diagram of a further embodiment of the wheel acceleration derivation circuit to be employed in the anti-skid brake control system of FIG. 1.

Though the wheel acceleration derivation circuits 32a and 32a' are provided as independent circuits in the former examples, it is also possible to formulate the wheel acceleration derivation circuit as a common circuit for deriving the high precision wheel acceleration data and high response wheel acceleration data. FIG. 16 shows an example of such a wheel acceleration derivation circuit for deriving both the high precision wheel acceleration data and high response wheel acceleration data. In this embodiment, the wheel acceleration derivation circuit 32a' is connected to the wheel speed derivation circuit 31a' for deriving high response wheel acceleration data $aw'$. The output of the wheel acceleration derivation circuit 32a' is directly output as high response wheel acceleration data $aw'$. Simultaneously, the output of the wheel acceleration derivation circuit 32a' is fed to a filter or averaging circuit 250 for removing a noise component superimposed on the wheel acceleration data $aw'$. The output of the filter or averaging circuit 250 can be used as high precision wheel acceleration data $aw$.

As will be appreciated herefrom, the present invention can achieves both high accuracy and high response in deriving the wheel acceleration for permitting precise anti-skid control.

What is claimed is:

1. An anti-skid brake control system for an automotive vehicle, comprising:
    a braking circuit including a wheel cylinder for generating a braking force for declaring a vehicular wheel in response to a manual braking operation;
    a pressure control valve disposed within said braking circuit for controlling said braking force to be generated in said wheel cylinder depending upon the vehicular braking condition, said pressure control valve increasing said braking force in said wheel cylinder in a first mode and decreasing said braking force in said wheel cylinder in a second mode;
    a sensor means for monitoring rotation speed of said vehicular wheel to produce a wheel speed indicative signal;
    first means for deriving a wheel speed data on the basis of said wheel speed indicative signal;
    second means for periodically deriving a first wheel acceleration data having a first precision level and a first lag time based on said wheel speed data;
    third means for periodically deriving a second wheel acceleration data having a second precision level and a second lag time based on said wheel speed data, where said second precision level is lower than said first precision level and said second lag time is shorter than said first lag time; and
    fourth means responsive to said first wheel acceleration data indicative of wheel deceleration greater than a predetermined wheel deceleration threshold, for initiating skid control cycle in which operation mode of said pressure control valve is selectively controlled between said first mode and said second mode so as to maintain wheel slippage at a predetermined optimum value according to a predetermined schedule, said fourth means further detecting a peak value of said second wheel acceleration data and causing braking pressure to increase in said first mode in said pressure control valve.

2. An anti-skid brake control system as set forth in claim 1, wherein said first means comprises a first wheel speed deriving means for periodically deriving a first wheel speed data with a first higher precision level and a second wheel speed deriving means for periodically deriving a second wheel speed data with a second lower precision level, and said second means derives said first wheel acceleration data based on said first wheel speed data and said third means derives said second wheel acceleration data based on said second wheel speed data.

3. An anti-skid brake control system as set forth in claim 1, wherein said first means periodically derives said wheel speed data, said second means samples a first given number of said wheel speed data for deriving said first wheel acceleration data on the basis of a difference of values of the sampled oldest wheel speed data and youngest wheel speed data and a first interval between timing of derivation of said oldest wheel speed data and said youngest wheel speed data, and said third means samples a second given number of said wheel speed data for deriving said second wheel acceleration data on the basis of a difference of the sampled said oldest wheel speed data and said youngest wheel speed data and a second interval between timing of derivation of said oldest wheel speed data and said youngest wheel speed data, said first given number being greater than said second given number and said first interval being greater than said second interval.

4. An anti-skid brake control system as set forth in claim 2, wherein said first and second wheel speed deriving means periodically derive said first and second wheel speed data, said second means samples a first given number of said first wheel speed data for deriving said first wheel acceleration data on the basis of a difference of values of the sampled oldest wheel speed data and youngest wheel speed data and a first interval between timing of derivation of said oldest wheel speed data and said youngest wheel speed data, and said third means samples a second given number of said second wheel speed data for deriving said second wheel acceleration data on the basis of a difference of values of the sampled said oldest wheel speed data and said youngest wheel speed data and a second interval between timing of derivation of said oldest wheel speed data and said youngest wheel speed data, said first given number being greater than said second given number of said first interval being greater than said second interval.

5. An anti-skid brake control system as set forth in claim 3, wherein said second means derives a first average value of said wheel speed indicative data over a first group of said sampled wheel speed data, said first group contains a series of wheel speed data over a given number of wheel speed derivation cycles and includes an instantaneous wheel speed data derived in a current wheel speed derivation cycle, and a second average value of said wheel speed indicative data over a second group of said sampled wheel speed data, said second group contains a series of wheel speed data over a given number of wheel speed derivation cycles and includes a wheel speed derived in a wheel speed derivation cycle ahead of the current derivation cycle by a predetermined number of cycles.

6. An anti-skid brake control system as set forth in claim 1, wherein said second means receives said second wheel acceleration data and removes a noise component superimposed on said second wheel acceleration data for producing said first wheel acceleration data.

7. An anti-skid brake control system for an automotive vehicle, comprising:
    a braking circuit including first and second wheel cylinders for generating a braking force for decelerating first and second vehicular wheels in response to a manual braking operation;
    first and second pressure control valves respectively disposed within said braking circuit for controlling said braking force to be generated in said wheel cylinder depending upon the vehicular braking condition, each of said first and second pressure control valves increasing said braking force in said wheel cylinder in a first mode and decreasing said braking force in said wheel cylinder in a second mode;
    a first wheel speed sensor means for monitoring rotation speed of said first vehicular wheel to produce a first wheel speed indicative signal;
    a second wheel speed sensor means for monitoring rotation speed of said second vehicular wheel to produce a second wheel speed indicative signal;
    first means for deriving first and second wheel speed data respectively on the basis of said first and second wheel speed indicative signals;
    second means for periodically deriving a first wheel acceleration data based on said first wheel speed data having a first precision level and a first lag time with respect to each of said first and second wheels;

third means for periodically deriving a second wheel acceleration data based on said second wheel speed data having a second precision level and a second lag time, said second precision level is lower than said first precision level and second lag time is shorter than said first lag time with respect to each of said first and second wheels; and fourth means responsive to said first wheel acceleration data indicative of wheel deceleration greater than a predetermined wheel deceleration threshold, for initiating skid control cycles for said respective first and second pressure control valves, in which the operation mode of each of said pressure control valves is selectively controlled between said first mode and second mode so as to maintain wheel slippage at a predetermined optimum value according to a predetermined schedule, said fourth means further detecting a peak value of said second wheel acceleration data and causing braking pressure to increase in said first mode in each of said pressure control valves.

8. An anti-skid brake control system as set forth in claim 1, wherein said first means comprises a first wheel speed deriving means for periodically deriving a first wheel speed data with a first higher precision level and a second wheel speed deriving means for periodically deriving a second wheel speed data with a second lower precision level.

9. An anti-skid brake control system as set forth in claim 7, wherein said first and second wheel speed deriving means periodically derives said first and second wheel speed data, said second means samples a first given number of said first wheel speed data for deriving said first wheel acceleration data on the basis of a difference of values of the sampled oldest wheel speed data and youngest wheel speed data and a first interval between the time of derivation of said oldest wheel speed data and said youngest wheel speed data, and said third means samples a second given number of said second wheel speed data for deriving said second wheel acceleration data on the basis of a difference of values of a second sampled oldest wheel speed data and youngest wheel speed data and a second interval between timing of derivation of said second oldest wheel speed data and the youngest wheel speed data, said first given number being greater than said second given number and said first interval being greater than said second interval.

10. An anti-skid brake control system as set forth in claim 9, wherein said second means derives a first average value of said first wheel speed indicative data over a first group of said first sampled wheel speed data, said first group contains a series of said first wheel speed data over a given number of wheel speed derivation cycles and includes an instantaneous wheel speed data derived in a current wheel speed derivation cycle, and a second average value of said second wheel speed indicative data over a second group of said second sampled wheel speed data, said second group contains a series of said second wheel speed data over a given number of wheel speed derivation cycles and includes a wheel speed derived in a wheel speed derivation cycle ahead of the current derivation cycle by a predetermined number of cycles.

11. An anti-skid brake control system as set forth in claim 7, wherein said second means receives said second wheel acceleration data and removes a noise component superimposed on said second wheel acceleration data for producing said first wheel acceleration data.

12. An anti-skid brake control system for an automotive vehicle, comprising:

a braking circuit including a wheel cylinder for generating a braking force for decelerating a vehicular wheel in response to a manual braking operation;

a pressure control valve disposed within said braking circuit for controlling said braking force to be generated in said wheel cylinder depending upon the vehicular braking condition, said pressure control valve increasing said braking force in said wheel cylinder in a first mode and decreasing said braking force in said wheel cylinder in a second mode;

a sensor means for monitoring rotation speed of said vehicular wheel to produce a wheel speed indicative signal;

first means for deriving a wheel speed data on the basis of said wheel indicative signal;

second means for periodically deriving a wheel acceleration data on the basis of said wheel speed data;

third means for deriving a vehicle speed representative data on the basis of said wheel speed data;

fourth means for receiving said vehicle speed representative data and modifying the received data for producing a modified vehicle speed representative data;

fifth means for receiving said vehicle speed representative data from said third means and said modified vehicle speed representative value for selecting a greater one of the received data to output as said vehicle speed representative data; and sixth means responsive to said wheel acceleration data indicative of wheel deceleration greater than a predetermined wheel deceleration threshold, for initiating skid control cycle in which operation mode of said pressure control valve is selectively controlled between said first mode and second mode so as to maintain wheel slippage at a predetermined optimum value according to a predetermined schedule on the basis of said wheel speed data and said selected vehicle speed representative data.

13. An anti-skid brake control system as set forth in claim 12, wherein said second means comprises a first wheel acceleration deriving means for deriving a first wheel acceleration with a first higher precision level and a first longer lag time, and a second wheel acceleration deriving means for deriving a second wheel acceleration with a second lower precision level and shorter lag time.

14. An anti-skid brake control system as set forth in claim 13, wherein said sixth means further detects a peak value of said second wheel acceleration data and deriving braking pressure increasing rate in said first mode of said pressure control valve.

15. An anti-skid brake control system as set forth in claim 14, wherein said first means comprises a first wheel speed deriving means for periodically deriving a first wheel speed data with a first higher precision level and a second wheel speed deriving means for periodically deriving a second wheel speed data with a second lower precision level, and said first wheel acceleration derivation means derives said first wheel acceleration data based on said first wheel speed data and said second wheel acceleration derivation means derives said second wheel acceleration data based on said second wheel speed data.

16. An anti-skid brake control system as set forth in claim 15, wherein said first and second wheel speed deriving means periodically derives said first and second wheel speed data, said first wheel acceleration derivation means samples a first given number of first wheel speed data for deriving said first wheel acceleration data on the basis of a difference of values of a first sampled oldest wheel speed data and youngest wheel speed data and a first interval between timing of derivation of said first oldest wheel speed data and said first youngest wheel speed data, and said second wheel acceleration derivation means samples a second given number of said second wheel speed data for deriving said second wheel acceleration data on the basis of a difference of values of a second sampled oldest wheel speed data and youngest wheel speed data and a second interval between timing of derivation of said second oldest wheel speed data and the second youngest wheel speed data, said first given number being greater than said second given number and said first interval being greater than said second interval.

17. An anti-skid brake control system as set forth in claim 16, wherein said first wheel acceleration derivation means derives a first average value of said first wheel speed indicative data over a first group of said first sampled wheel speed data, said first group contains a series of said first wheel speed data over a given number of wheel speed derivation cycles and includes an instantaneous wheel speed data derived in a current wheel speed derivation cycle, and a second average value of said second wheel speed indicative data over a second group of said second sampled wheel speed data, said second group contains a series of said second wheel speed data over a given number of wheel speed derivation cycles and includes a wheel speed derived in a wheel speed derivation cycle ahead of the current derivation cycle by a predetermined number of cycles.

18. An anti-skid brake control system as set forth in claim 13, wherein said first wheel acceleration derivation means receives said second wheel acceleration data and removes a noise component superimposed said second wheel acceleration data for producing said first wheel acceleration data.

* * * * *